(12) United States Patent
Aoyagi

(10) Patent No.: US 10,298,668 B2
(45) Date of Patent: May 21, 2019

(54) INTERACTIVE SYSTEM, TERMINAL APPARATUS, SERVER APPARATUS, CONTROL METHOD, PROGRAM, AND RECORDING MEDIUM

(71) Applicant: SQUARE ENIX CO., LTD., Tokyo (JP)

(72) Inventor: Hidetoshi Aoyagi, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 268 days.

(21) Appl. No.: 15/126,456

(22) PCT Filed: Oct. 8, 2014

(86) PCT No.: PCT/JP2014/076934
§ 371 (c)(1),
(2) Date: Sep. 15, 2016

(87) PCT Pub. No.: WO2015/145834
PCT Pub. Date: Oct. 1, 2015

(65) Prior Publication Data
US 2017/0085631 A1    Mar. 23, 2017

(30) Foreign Application Priority Data
Mar. 24, 2014  (JP) .................. 2014-060790

(51) Int. Cl.
*H04L 29/08* (2006.01)
*H04L 29/06* (2006.01)
(Continued)

(52) U.S. Cl.
CPC .......... *H04L 67/1002* (2013.01); *G06F 9/445* (2013.01); *G06F 9/48* (2013.01);
(Continued)

(58) Field of Classification Search
CPC ....... H04L 67/42; H04L 67/1002; G06F 9/48; G06F 9/445; G06F 9/485; G06F 13/00
See application file for complete search history.

(56) References Cited

U.S. PATENT DOCUMENTS

| 9,694,277 | B2* | 7/2017 | Justice | A63F 13/12 |
| 2003/0114227 | A1* | 6/2003 | Rubin | A63F 13/10 |
| | | | | 463/43 |

(Continued)

FOREIGN PATENT DOCUMENTS

| JP | 2002-135350 | 5/2002 |
| JP | 2006-270729 | 10/2006 |

(Continued)

OTHER PUBLICATIONS

International Search Report (ISR) from International Searching Authority (Japan Patent Office) in International Pat. Appl. No. PCT/JP2014/076934, dated Jan. 6, 2015.

*Primary Examiner* — Kostas J Katsikis
(74) *Attorney, Agent, or Firm* — Greenblum & Bernstein, P.L.C.

(57) ABSTRACT

Provided is an interactive system in which program processing which is performed by a server apparatus in response to a request from a terminal apparatus can be preserved in a desired condition. An interactive system includes a terminal apparatus that is connected to a server apparatus via a network, requests the server apparatus to perform program processing, receives a processing result from the server apparatus, and displays the processing result, and the server apparatus that performs program processing in response to a request from the terminal apparatus, and transmits a processing result to the terminal apparatus, in which the terminal apparatus determines a predetermined condition in which execution of a display process of dis- (Continued)

playing the processing result from the server apparatus is suspended, and transmits a suspension signal to the server apparatus.

26 Claims, 24 Drawing Sheets

(51) Int. Cl.
  *G06F 9/48* (2006.01)
  *G06F 13/00* (2006.01)
  *G06F 9/445* (2018.01)
(52) U.S. Cl.
  CPC .............. *G06F 9/485* (2013.01); *G06F 13/00* (2013.01); *H04L 67/42* (2013.01)

(56) References Cited

U.S. PATENT DOCUMENTS

| | | | | |
|---|---|---|---|---|
| 2005/0261062 A1* | 11/2005 | Lewin | ...................... | A63F 13/12 463/42 |
| 2006/0148571 A1* | 7/2006 | Hossack | .................. | A63F 13/10 463/43 |
| 2006/0183521 A1* | 8/2006 | Hamamoto | ............ | A63F 13/10 463/8 |
| 2006/0261548 A1* | 11/2006 | Casanova | ................. | A63F 3/00 273/236 |
| 2007/0259709 A1* | 11/2007 | Kelly | .................. | G07F 17/3267 463/20 |
| 2008/0015030 A1* | 1/2008 | Baazov | ................... | G07F 17/32 463/42 |
| 2008/0146342 A1* | 6/2008 | Harvey | ................... | A63F 13/10 463/42 |
| 2008/0244331 A1* | 10/2008 | Grimes | ............... | G06F 11/0727 714/48 |
| 2008/0274785 A1* | 11/2008 | Byng | ...................... | G07F 17/32 463/20 |
| 2011/0294559 A1* | 12/2011 | Morrow | .............. | G07F 17/3223 463/20 |
| 2013/0267324 A1* | 10/2013 | Froy, Jr. | .............. | G07F 17/3225 463/42 |
| 2013/0293675 A1 | 11/2013 | Iwasaki | | |
| 2014/0179421 A1* | 6/2014 | Quinn | ..................... | A63F 13/00 463/31 |
| 2014/0179424 A1* | 6/2014 | Perry | ..................... | A63F 13/355 463/31 |
| 2014/0179436 A1* | 6/2014 | Karamfilov | ............. | A63F 13/12 463/32 |
| 2014/0230002 A1 | 8/2014 | Kitazato | | |
| 2014/0267429 A1* | 9/2014 | Justice | ...................... | G06T 3/60 345/649 |
| 2014/0274379 A1* | 9/2014 | Justice | .................... | A63F 13/12 463/31 |
| 2015/0018072 A1* | 1/2015 | Palchetti | ............... | G07F 17/326 463/25 |
| 2015/0156474 A1 | 6/2015 | Iwasaki | | |
| 2015/0209666 A1* | 7/2015 | Harris | ..................... | A63F 13/27 463/31 |
| 2015/0301715 A1* | 10/2015 | Schlossberg | ............ | A63F 13/27 463/31 |
| 2015/0321090 A1* | 11/2015 | Schlossberg | ............ | A63F 13/27 463/31 |
| 2015/0321095 A1* | 11/2015 | Schlossberg | ............ | A63F 13/27 463/31 |
| 2017/0274284 A1* | 9/2017 | Justice | .................... | A63F 13/12 |

FOREIGN PATENT DOCUMENTS

| | | |
|---|---|---|
| JP | 2010-227455 | 10/2010 |
| JP | 2011-078634 | 4/2011 |
| JP | 2013-070268 | 4/2013 |
| JP | 2013-243702 | 12/2013 |
| WO | 2013/042531 | 3/2013 |
| WO | WO-2017189321 A1 * | 11/2017 ........... A63F 13/355 |

* cited by examiner

United States Patent US 10,298,668 B2

INTERACTIVE SYSTEM, TERMINAL APPARATUS, SERVER APPARATUS, CONTROL METHOD, PROGRAM, AND RECORDING MEDIUM

TECHNICAL FIELD

The present invention relates to an interactive system, a terminal apparatus, a server apparatus, a control method, a program, and a recording medium, and particularly to an interactive system technique in which a server apparatus performs processing on a program on the basis of a request from a terminal apparatus.

The present application claims priority from Japanese Patent Application No. 2014-60790 filed on Mar. 24, 2014, the content of which is hereby incorporated by reference into this application.

BACKGROUND ART

Client terminal apparatuses such as portable game machines or smart phones which can be connected to a network have been widespread. Due to the widespread client terminal apparatuses, the network population on the Internet has increased. In recent years, various services using the Internet have been provided to network users, and entertainment services such as games also have been provided thereto.

As one of the services for network users, there is a cloud application. The cloud application is an application program which provides functions or services via a cloud server connected to a network, and a client terminal apparatus side receives, displays or reproduces, for example, image data or sound data as a result of the application program processed by the cloud server.

In the above-described cloud application, the cloud server performs a rendering process related to the application program, and thus a service can be provided to a portable game machine or a smart phone having lower processing performance than that of a game dedicated machine or a personal computer having fast graphic processing performance. In other words, the number of client terminal apparatuses which can use the service increases, and thus the service can be provided to more users.

For example, PTL 1 discloses games playable by a user without depending on processing performance such as rendering performance of a client terminal apparatus. In the games as disclosed in PTL 1, a server apparatus acquires information regarding an operation performed in a client terminal apparatus, executes a game program by using the information, and provides a rendered game image to the client terminal apparatus.

CITATION LIST

Patent Literature

[PTL 1] JP-A-2013-243702

SUMMARY OF INVENTION

Technical Problem

In the games as disclosed in PTL 1, since the game program is executed in the server apparatus, it is difficult for a user to preserve a progress situation of the program only under a permitted condition (so-called savepoint) during execution of the game program unless a structure of preserving saved data in real time is used.

In a case where a game program executed in the server apparatus does not have a function of preserving the saved data in real time, especially, in a case of a game program used in a local environment which is not compatible with a network, the game program may be rewritten so that saved data is preserved in real time, and a service may be provided, but labor to rewrite the game program occurs.

At least one embodiment of the present invention is to solve the above-described problem in the related art, and an object thereof is to provide an interactive system capable of appropriately preserving a progress situation of an application program which is executed by a server apparatus in response to a request from a terminal apparatus.

Solution to Problem

In order to solve the above-described problem, according to an embodiment of the present invention, there is provided an interactive system including a terminal apparatus that is connected to a server apparatus via a network, requests the server apparatus to perform program processing, receives a processing result from the server apparatus, and displays the processing result; and the server apparatus that performs program processing in response to a request from the terminal apparatus, and transmits a processing result to the terminal apparatus, in which the terminal apparatus determines a predetermined condition in which execution of a display process of displaying the processing result from the server apparatus is suspended, and transmits a suspension signal to the server apparatus.

In order to solve the above-described problem, according to another embodiment of the present invention, there is provided a terminal apparatus connected to a server apparatus via a network, requesting the server apparatus to perform program processing, receiving a processing result from the server apparatus, and displaying the processing result, determining a predetermined condition in which execution of a display process is suspended, and transmitting a suspension signal to the server apparatus.

In order to solve the above-described problem, according to another embodiment of the present invention, there is provided a server apparatus connected to a terminal apparatus via a network, performing program processing in response to a request from the terminal apparatus, transmitting a processing result to the terminal apparatus, receiving a suspension signal based on a predetermined condition in which a display process of displaying the processing result from the server apparatus is suspended, from the terminal apparatus, and temporarily suspending the program processing requested by the terminal apparatus.

Advantageous Effects of Invention

According to an embodiment of the present invention, it is possible to appropriately preserve a progress situation of an application program which is executed by a server apparatus in response to a request from a terminal apparatus regardless of a condition in which preservation is permitted in the application program.

DESCRIPTION OF EMBODIMENTS

Figure 1:
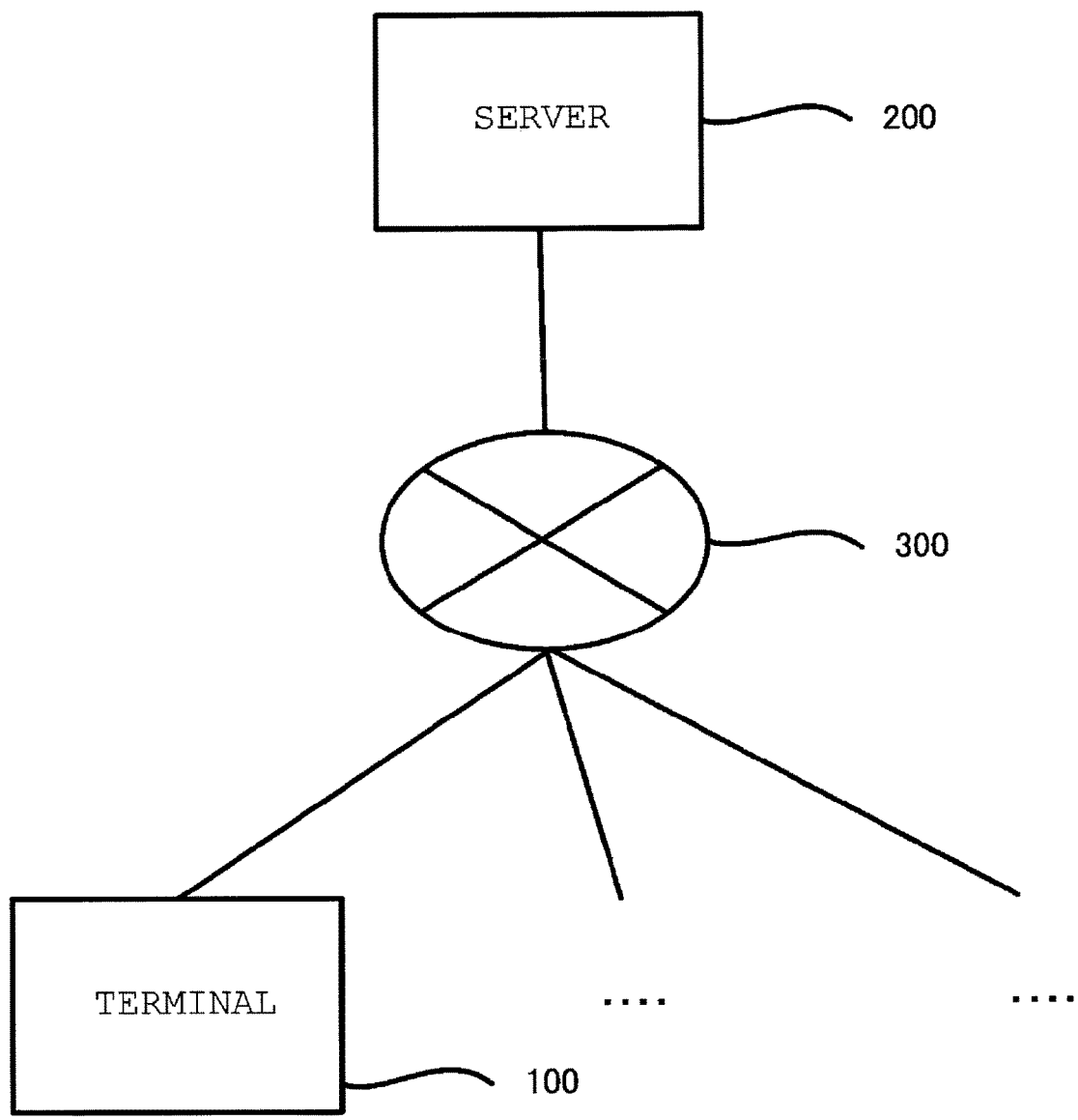
FIG. 1 is a diagram illustrating a system configuration of an interactive system according to an embodiment of the present invention.

Hereinafter, an embodiment of the present invention (hereinafter, referred to as the present embodiment) will be described in the following order with reference to the drawings. The present invention is not limited to the following embodiment, and may be variously modified within the scope without departing from the spirit of the present invention.

1. Configuration of interactive system
2. Configuration of terminal apparatus
3. Configuration of server apparatus
4. Game image display process
5. Game suspension signal generation/transmission process (1)
6. Game image generation/transmission process (1)
7. Game program temporary suspension process (1)
8. Game program temporary suspension process (2)
9. Game program resuming process (1)
10. Game program resuming process (2)
11. Game suspension signal generation/transmission process (2)
12. Game suspension signal generation/transmission process (3)
13. Game image generation/transmission process (2)
14. Game image generation/transmission process (3)
15. Game program temporary suspension process (3)
16. Game program temporary suspension process (4)
17. Game program resuming process (2)
18. Game program resuming process (3)
19. Game program temporary suspension process (5)
20. Game program temporary suspension process (6)
21. Game program temporary suspension process (7)

<1. Configuration of Interactive System>

FIG. 1 is a diagram illustrating a configuration of an interactive system according to the present embodiment.

The interactive system according to the present embodiment includes terminal apparatuses 100 and a server apparatus 200, and the terminal apparatus 100 and the server apparatus 200 are connected to each other via a network 300.

Here, the interactive system according to the present embodiment is a bidirectional type system in which a processing result of a game program is provided from the server apparatus in response to an input operation performed on the terminal apparatus by a user. The type of provided program is not limited to the game program, and may be various application programs or moving image distribution programs in which a progress situation of the program is required to be preserved. The processing result received from the server apparatus may be all results or some results of the processing on the game program. Specifically, the process result corresponds to, for example, a game image or a game sound, and, in the following description, the process result will be described as a game image but is not limited thereto.

First, the terminal apparatus 100 in the present embodiment receives a game image related to the game program executed in the server apparatus 200 as coded moving image data, and displays the received coded moving image data as a game image. The terminal apparatus 100 transmits user's operation input information to the server apparatus 200, and determines a predetermined condition in which the game image display process is suspended, so as to transmit a suspension signal to the server apparatus.

Consequently, the terminal apparatus 100 can provide a game image related to the game program executed in the server apparatus 200, to the user. The terminal apparatus 100 can make a request for performing an appropriate suspension process on the server apparatus 200 side by transmitting the suspension signal.

The terminal apparatus 100 has a configuration in which a processing result of the game program in the server apparatus 200 can be displayed.

The terminal apparatus 100 may be an apparatus which displays a process result received from the server apparatus 200, such as a game dedicated machine, a portable game machine, a smart phone, a personal digital assistant (PDA), and a tablet PC.

Next, the server apparatus 200 in the present embodiment receives a signal (input operation signal) corresponding to an input operation performed on the terminal apparatus 100 by the user, and generates a game image related to the game program for each frame according to the input operation signal. The server apparatus 200 compresses the generated game image and codes the generated image for the purpose of security, and transmits coded moving image data which is obtained, to the terminal apparatus 100. The server apparatus 200 receives a suspension signal from the terminal apparatus 100, and performs a temporary suspension process of the game program based on the suspension signal.

The server apparatus 200 has a configuration of receiving an operation signal from the terminal apparatus 100, and transmitting a processing result of the game program to the terminal apparatus 100. Rendering of a game image of each frame is not necessarily required to be performed by the server apparatus 200, and may be performed by, for example, an image processing dedicated server (not illustrated) connected to the server apparatus 200. A part of a game image may be rendered in the terminal apparatus 100, and the rendered game image may be combined with other portions in the server apparatus 200.

<2. Configuration of Terminal Apparatus>

Figure 2:
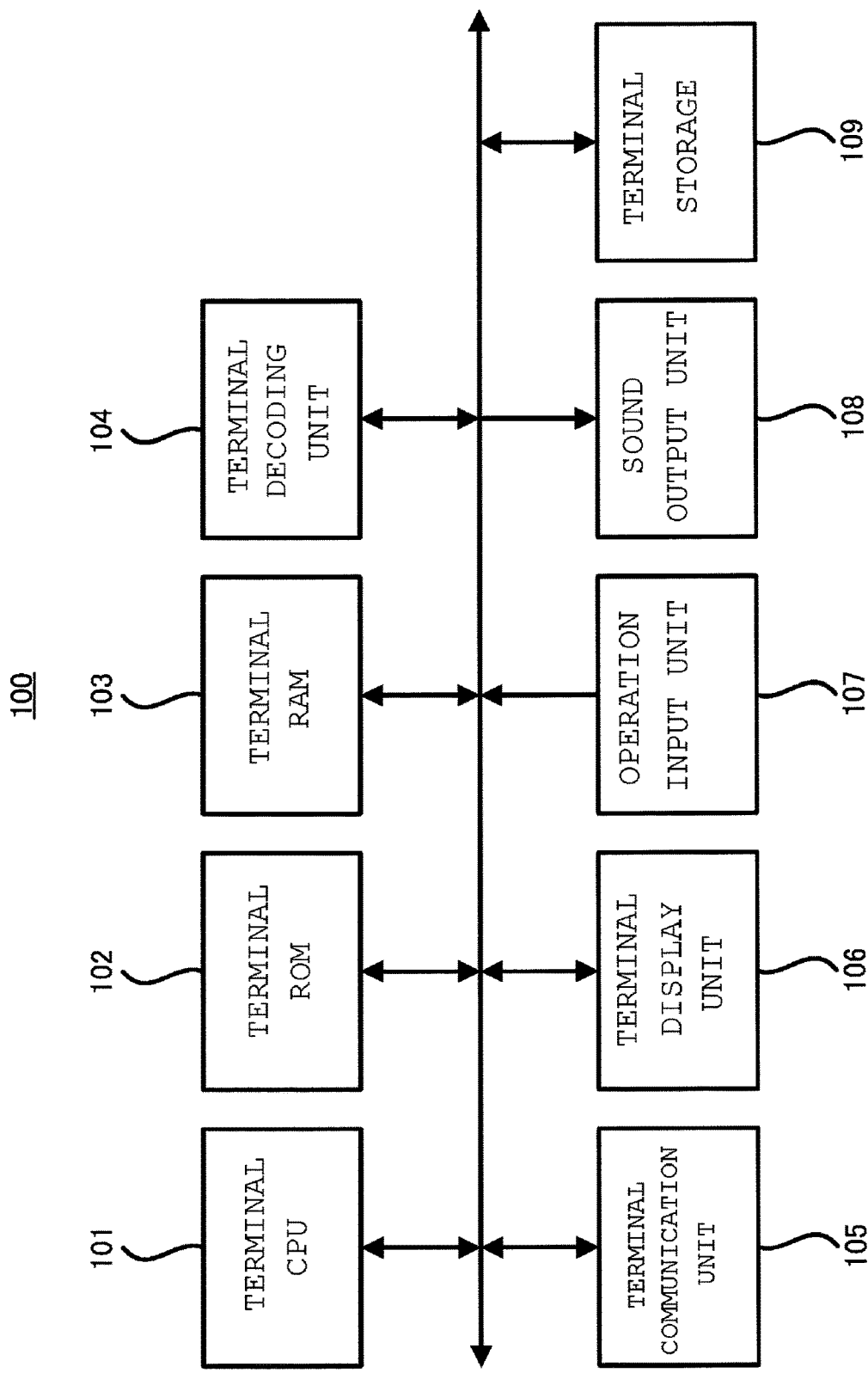
FIG. 2 is a block diagram illustrating a functional configuration of a terminal apparatus according to the embodiment of the present invention.

FIG. 2 is a block diagram illustrating a functional configuration of the terminal apparatus 100 according to the present embodiment.

The terminal apparatus 100 includes a terminal central processing unit (CPU) 101 which performs a process of executing a program; a terminal read only memory (ROM) 102 which stores the program executed by the terminal CPU 101; a terminal random access memory (RAM) 103 in which the program or data is developed; a terminal decoding unit 104 which decodes coded data; a terminal communication unit 105 which performs communication with the server apparatus 200; a terminal display unit 106 which displays a result or the like related to the program executed by the terminal CPU 101; an operation input unit 107 which receives various input operations from the user; a sound output unit 108 which outputs a sound; and a terminal storage 109 which stores programs or data in an invariable manner.

The terminal CPU 101 controls an operation of each block of the terminal apparatus 100. Specifically, the terminal CPU 101 reads, for example, an operation program for a game image display process recorded in the terminal ROM 102, develops the operation program in the terminal RAM 103, and executes the operation program, thereby controlling an operation of each block. Here, the operation program functions as a display player displaying an image received from the server apparatus 200. However, the operation program does not hinder the terminal apparatus 100 from rendering a partial image.

The terminal ROM 102 is, for example, a read only nonvolatile memory. The terminal ROM 102 stores information regarding constants necessary in an operation of each block of the terminal apparatus 100 in addition to the operation program for a game image display process or the like.

The terminal RAM 103 is a volatile memory. The terminal RAM 103 is used not only as a region in which the operation program is developed but also as a storage region which temporarily stores intermediate data or the like which is output during an operation of each block of the terminal apparatus 100.

The terminal decoding unit 104 performs a decoding process on coded moving image data received by the terminal communication unit 105 which will be described later, so as to generate a game image of one or more frames.

The terminal communication unit 105 is a communication interface of the terminal apparatus 100. The terminal communication unit 105 performs data transmission and reception with other apparatuses such as the server apparatus 200 connected thereto via the network 300. During transmission of data, the terminal communication unit 105 converts a format of the data into a data transmission format defined between the terminal communication unit and the network 300 or an apparatus at a transmission destination, and transmits the data to the apparatus at the transmission destination. During reception of data, the terminal communication unit 105 converts a format of the data received via the network 300 into any data format which is readable in the terminal apparatus 100, and stores the data in the terminal RAM 103, for example, under the control of the terminal CPU 101.

The present embodiment will be made assuming that the terminal apparatus 100 and the server apparatus 200 are connected to each other via the network 300, but there may be a form in which the terminal apparatus 100 and the server apparatus 200 are directly connected to each other via, for example, a cable.

The terminal display unit 106 is, for example, a display device such as a liquid crystal display (LCD) provided in the terminal apparatus 100. The terminal display unit 106 performs display control for displaying the input game image in a display region. The terminal display unit 106 may be a large-sized monitor or the like externally connected to the terminal apparatus 100 via a cable or the like.

The operation input unit 107 is, for example, a user interface such as a touch panel or a game pad provided in the terminal apparatus 100. If it is detected that an input operation on the user interface is performed by the user, the operation input unit 107 outputs an input operation signal corresponding to the input operation to the terminal CPU 101.

The sound output unit 108 is, for example, an acoustic device such as a speaker provided in the terminal apparatus 100. In a case where sound information is provided along with a game image, the sound output unit 108 outputs the provided sound information as a sound. In the present embodiment, an example in which a sound is output is not mentioned, but may be applied as necessary.

The terminal storage 109 is used as a storage region which stores an operation program developed in the terminal RAM 103, or intermediate data which is output during an operation of each block of the terminal apparatus 100, in an invariable manner. As the terminal storage 109, various storage means such as a hard disk drive (HDD) may be used, but a nonvolatile memory is preferably used in a portable terminal apparatus in terms of miniaturization, low power consumption, and shock resistance.

<Configuration of Server Apparatus 200>

Figure 3:
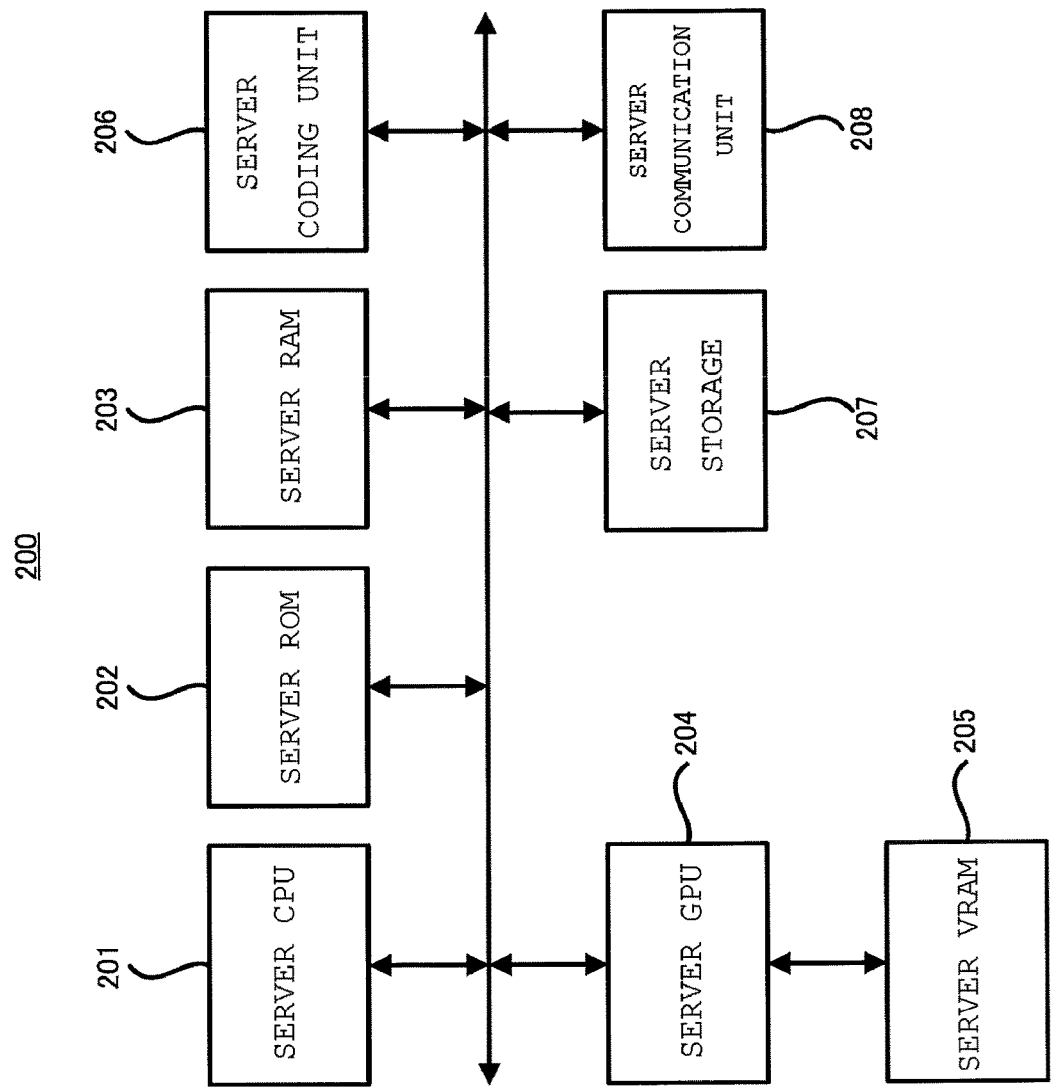
FIG. 3 is a block diagram illustrating a functional configuration of a server apparatus according to the embodiment of the present invention.

FIG. 3 is a block diagram illustrating a functional configuration of the server apparatus 200 according to the present embodiment.

The server apparatus 200 includes a server central processing unit (CPU) 201 which performs a process of executing a program; a server read only memory (ROM) 202 which stores the program executed by the server CPU 201; a server random access memory (RAM) 203 in which the program or data is developed; a server graphics processing unit (GPU) 204 which performs image processing calculation; a server video random access memory (VRAM) 205 which is connected to the server GPU; a server coding unit 206 which codes data; a server storage 207 which stores programs or data in an invariable manner; and a server communication unit 208 which performs communication with the terminal apparatus 100.

The server CPU 201 controls an operation of each block of the server apparatus 200. Specifically, the server CPU 201 reads, for example, an operation program related to a game image generation/transmission process which will be described later, stored in the server ROM 202, develops the operation program in the server RAM 203, and executes the operation program, thereby controlling an operation of each block.

The server ROM 202 is, for example, a read only nonvolatile memory. The server ROM 202 stores information regarding constants necessary in an operation of each block of the server apparatus 200 in addition to the operation program for a game image generation/transmission process or the like.

The server RAM 203 is a volatile memory. The server RAM 203 is used not only as a region in which the operation program is developed but also as a storage region which temporarily stores intermediate data or the like which is output during an operation of each block of the server apparatus 200.

The server GPU 204 generates a game image displayed on the terminal display unit 106 of the terminal apparatus 100. If a rendering command is received from the server CPU 201, the server GPU 204 renders a game image on the basis of the rendering command, and stores the rendered game image in the server VRAM 205.

The server coding unit 206 performs a coding process on the game image stored in the server VRAM 205 or the like. For example, the server coding unit 206 divides the game image to be coded into blocks, and performs intra coding (intra-frame coding) or inter coding (inter-frame coding) on each block. In the present embodiment, the server coding unit 206 performs discrete cosine transform (DCT) on each block for each color channel of YCbCr, and then compresses the block through run length coding.

The server storage 207 is, for example, a recording device such as a hard disk drive (HDD) which is attachable to and detachable from the server apparatus 200. In the present embodiment, when a suspension signal which will be described later is received, the content of an execution memory in the server RAM 203 or the server VRAM 205 is stored in the server storage 207 in an invariable manner.

The server communication unit 208 is a communication interface of the server apparatus 200. In the present embodiment, the server communication unit 208 performs data transmission and reception with other apparatuses such as the terminal apparatus 100 connected thereto via the network 300. The server communication unit 208 performs conversion of a data format depending on a communication standard in the same manner as the terminal communication unit 105.

<4. Game Image Display Process>

Figure 4:
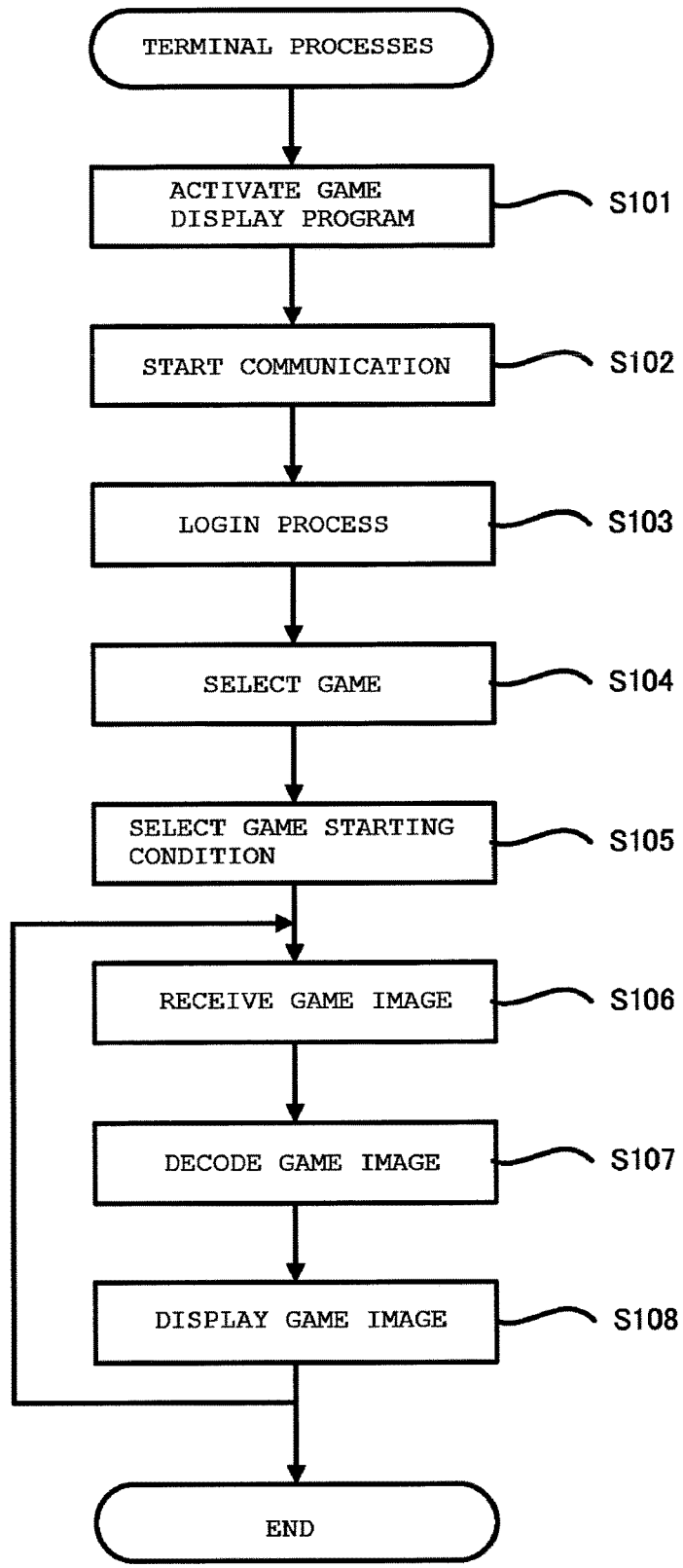
FIG. 4 is a flowchart exemplifying a game image display process performed by the terminal apparatus according to the embodiment of the present invention.

A description will be made of specific processes of a game image display process performed by the terminal apparatus 100 of the present embodiment with reference to a flowchart of FIG. 4. Processes corresponding to the flowchart may be realized by the terminal CPU 101 reading a corresponding processing program stored in, for example, the terminal ROM 102, and developing the program in the terminal RAM 103, and executing the program.

In step S101, the terminal CPU 101 activates a server cooperative program in response to an input operation performed on the input operation unit 107 by the user, and causes to the process to proceed to step S102.

In step S102, the terminal CPU 101 performs communication between the terminal communication unit 105 and the server apparatus 200 so as to check interconnection, and causes the process to proceed to step S103.

In step S103, the terminal CPU 101 transmits login information which is input by the user operating the operation input unit 207 or is stored in the terminal ROM 202 or the terminal RAM 203 in advance, to the server apparatus 200, and causes the process to proceed to step S104. Here, the login information is assumed to be at least a user ID and a password for identifying the user.

In step S104, the terminal CPU 101 acquires a list of game programs related to which a process can be provided from the server apparatus 200 on the basis of the transmitted login information, from the server apparatus 200, displays the list on the display unit 106, specifies a game program selected by the user when the user operates the operation input unit 207, and requests the server apparatus 200 to transmit a process related to the game program and a process result thereof. The terminal CPU 101 causes the process to proceed to step S105. The process related to the game program may be various processes such as a game image generation process or a game sound generation process, and, hereinafter, the game image generation process will be described but is only an example. For example, the user's input operation during playing of a game is also included in requesting the server apparatus to transmit program processing.

In step S105, the terminal CPU 101 acquires information regarding a game starting condition from the server apparatus 200, lists game starting conditions on the display unit 106 on the basis of the received information, specifies a game starting condition selected by the user operating the operation input unit 207, and requests the server apparatus 200 to start the game program. The terminal CPU 101 causes the process to proceed to step S106.

Here, as will be described in detail in a description of an operation of the server apparatus 200, as information regarding the game starting condition, there are conditions in which, in a case a game is started from the beginning, in a case where there is saved data at a savepoint, the game is started from the savepoint, and in a case where there is suspension data, the game is started from the suspension data. In a case where there are a plurality of items of saved data or suspension data, any one thereof may be selected.

In step S106, the terminal CPU 101 starts to receive coded moving image data from the server apparatus 200 via the terminal communication unit 105, and starts to buffer the data in the terminal RAM 103 or the like. The terminal CPU 101 causes the process to proceed to step S107.

In step S107, the terminal CPU 101 transmits the coded moving image data which has been received and buffered in the terminal RAM 103 or the like, to the terminal decoding unit 104, and causes the terminal decoding unit 104 to perform a decoding process. The terminal CPU 101 causes the process to proceed to step S108.

In step S108, the terminal CPU 101 displays a decoded game image on the terminal display unit 106. Thereafter, the terminal CPU 101 performs looping of the processes in steps S106 to S108 by using a game image display program, and transmits a decoded game image to the terminal display unit 106 as long as coded moving image data is continuously received.

<5. Game Suspension Signal Generation/Transmission Process (1)>

Figure 5:
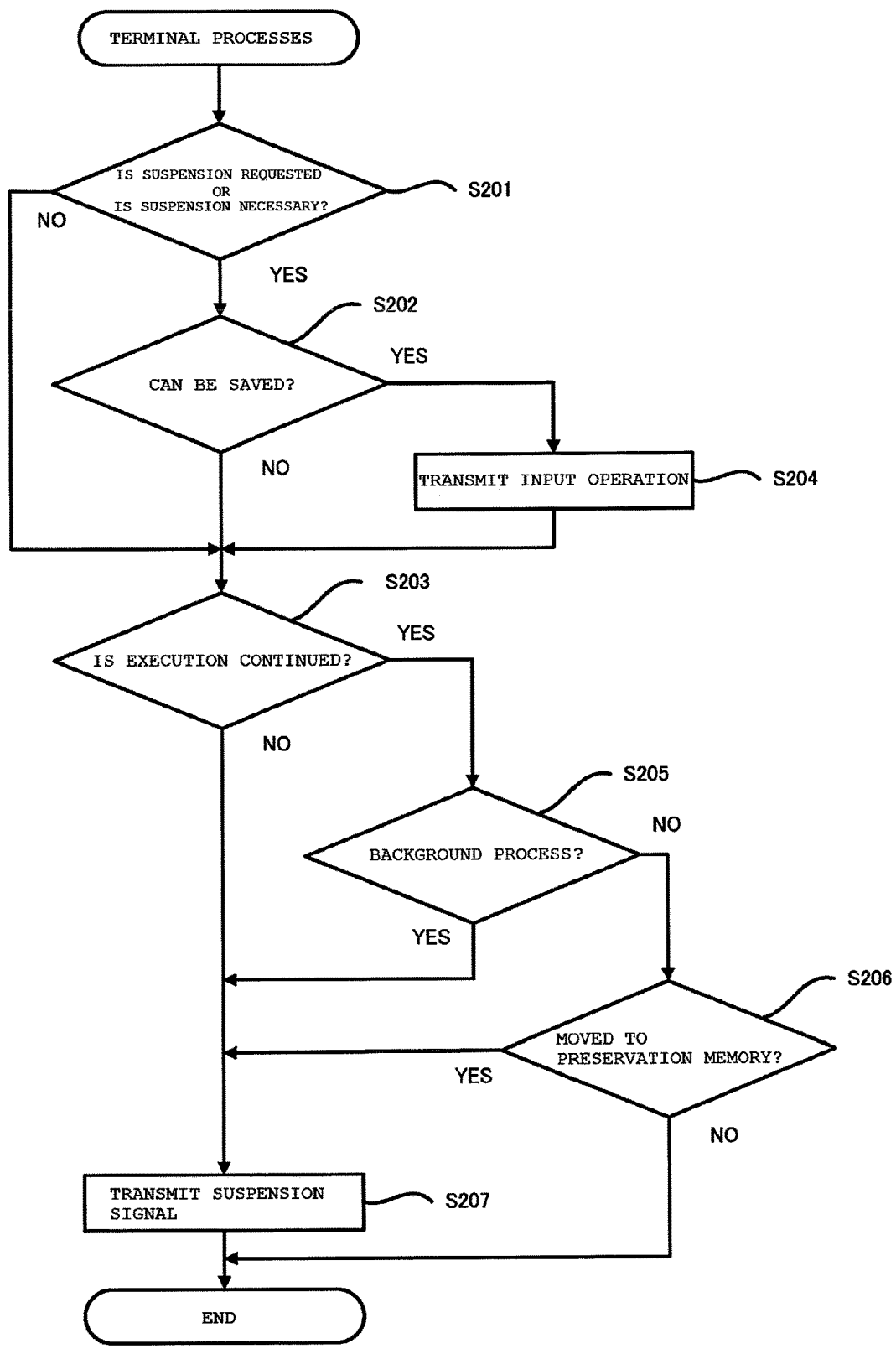
FIG. 5 is a flowchart exemplifying a game suspension signal transmission process performed by the terminal apparatus according to the embodiment of the present invention.

Next, a description will be made of specific processes of a game suspension signal generation/transmission process performed by the terminal apparatus 100 of the present embodiment with reference to a flowchart of FIG. 5. Processes corresponding to the flowchart may be realized by the terminal CPU 101 reading a corresponding processing program stored in, for example, the terminal ROM 102, and developing the program in the terminal RAM 103, and executing the program. This game suspension signal generation/transmission process is performed in parallel to the processes in steps S106 to S108 related to the game image display program.

In step S201, the terminal CPU 101 causes the process to proceed to step S202 in a case where suspension of processing based on the game image display program is requested by the user performing an input operation on the input operation unit 107, or processing based on the game image display program is required to be forced to be suspended on the basis of determination of the terminal CPU 101, and causes the process to proceed to step S203 in a case where there is no suspension request and suspension is not necessary.

In step S202, the terminal CPU 101 performs communication with the server apparatus 200 via the terminal communication unit 105, so as to determine whether or not a game program executed in the server apparatus 200 is under a condition in which the game program can be saved, that is, at a so-called savepoint, and transmits an input operation signal from the user to the server apparatus 200 in step S204 in a case where it is determined that the game program can be saved. As will be described later in detail, in the server apparatus 200, the server CPU 201 generates saved data at the savepoint, and preserves the saved data in the server storage 207 or the like.

In step S203, the terminal CPU 101 determines whether or not the game image display program can be continuously executed. Specifically, the terminal CPU determines a case or the like where the game image display program described in FIG. 4 does not operate due to errors or the like, and causes the process to proceed to step S207. Also in a case where it is determined that the game image display program cannot be continuously executed or is not executed, the terminal CPU 101 causes the process to proceed to step S207.

On the other hand, in step S203, in a case where it is determined that the game image display program is continuously executed, the terminal CPU 101 causes the process to proceed to step S205.

In step S205, the terminal CPU 101 determines whether or not the game image display program undergoes a background process. In a case where it is determined that the game image display program undergoes background processing, the terminal CPU 101 causes the process to proceed to step S207.

On the other hand, in step S205, it is determined that the game image display program does not undergo a background process, that is, undergoes a foreground process, the terminal CPU 101 causes the process to proceed to step S206.

Figure 6:
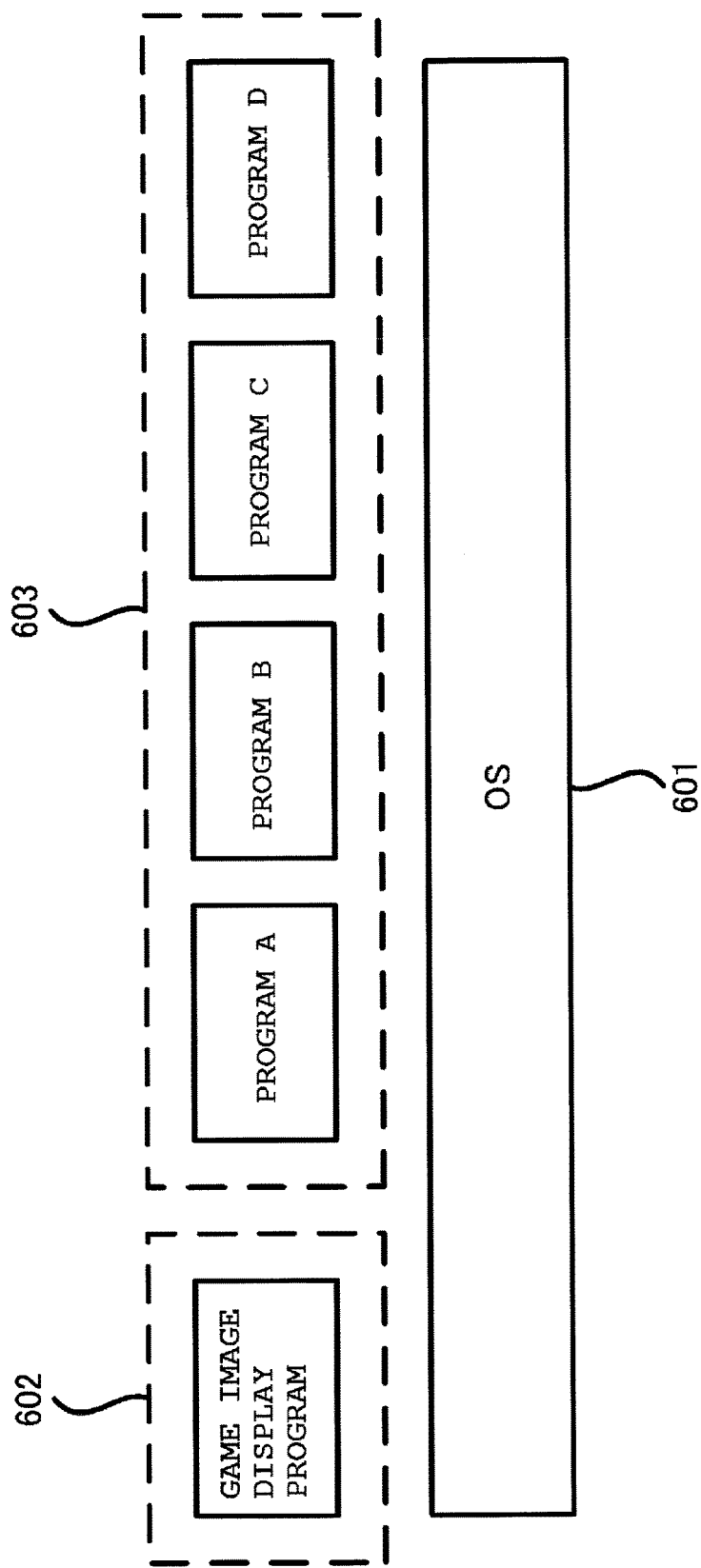
FIG. 6 is a diagram for explaining a concept of a multitasking process.

The background process will be described here. The background process is hidden in a foreground process which is being displayed on the terminal display unit 106 or the like to a user in a multitasking environment, and thus is not displayed on the terminal display unit 106 or the like and is performed on the background. The background process is a process which is continuously performed while consuming resources of the terminal CPU 101. As illustrated in FIG. 6, in the terminal apparatus 100, the game image display program undergoes a multitasking process on an operating system 601 or middleware (not illustrated). For example, in FIG. 6, the game image display program undergoes a foreground process 602, and a program A, a program B, a program C, and a program D undergo a background process 603. In a case where the program A during the background process transitions to the foreground process 602, the game image display program transitions to the background process.

In step S206, the terminal CPU 101 determines whether or not the information regarding the game image display program which is developed for execution is moved from an execution memory to a preservation memory. In a case where it is determined that the information regarding the game image display program is moved to the preservation memory, the terminal CPU 101 causes the process to proceed to step S207. On the other hand, in a case where it is determined that the information regarding the game image display program is not moved to the preservation memory, the terminal CPU 101 finishes the process. Specifically, the terminal CPU 101 determines whether or not the game image display program developed in the terminal RAM 103 is moved to the terminal storage 109.

Here, in the present embodiment, the term "movement" indicates that the memory content is copied from the execution memory to the preservation memory as it is, so that the memory content of the execution memory is opened, that is, in the terminal apparatus 100, the information regarding the game image display program in the terminal RAM 103 is copied to the terminal storage 109 as it is, and thus the information regarding the game image display program in the terminal RAM 103 is opened.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

Figure 7:
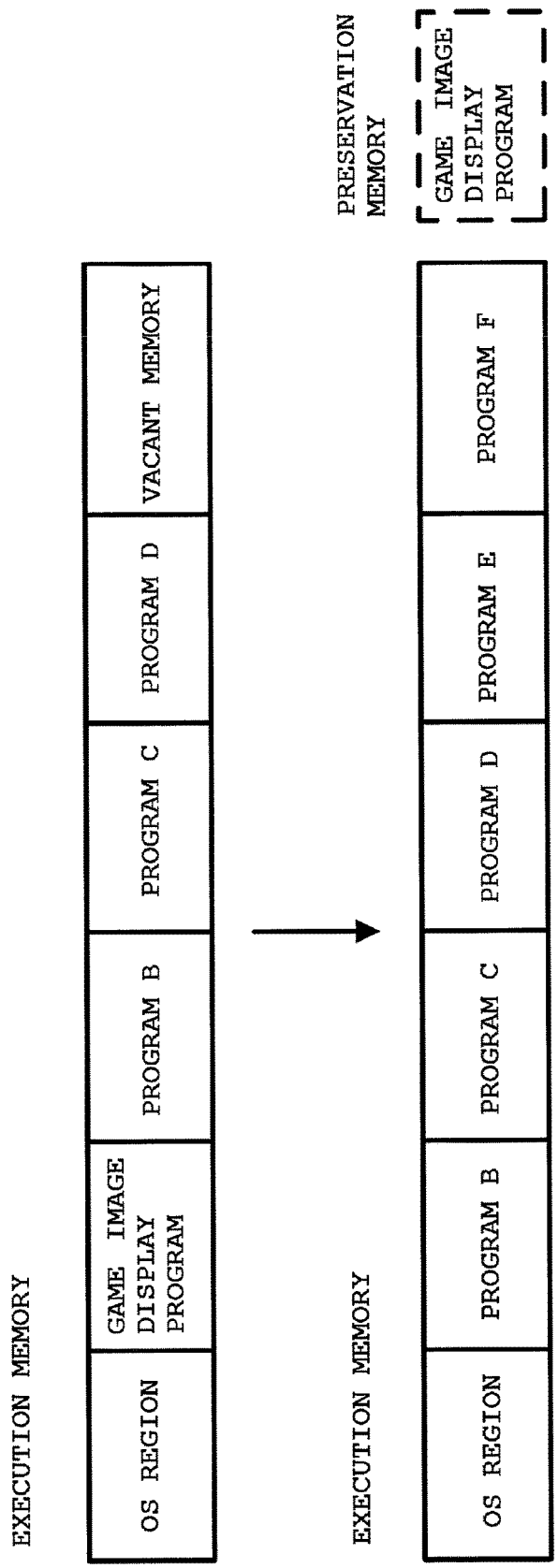
FIG. 7 is a diagram for explaining an execution memory and a preservation memory according to the embodiment of the present invention.

For example, the terminal RAM 101 is used as the execution memory, and the capacity thereof is finite. Thus, if a plurality of programs are developed in the terminal RAM 101, the capacity thereof is exceeded. In a case where the program B, the program C, and the program D are being executed in addition to the game image display program, there is a vacancy in the execution memory as illustrated in an upper part of FIG. 7. However, as illustrated in a lower part of FIG. 7, if a program E and a program F are further executed, a residual capacity is reduced, and thus information regarding a program with low priority is moved to the terminal storage 109 which is the preservation memory. In the present embodiment, the movement indicates that information stored in a memory is copied to another memory, and the information is deleted from the source memory.

The preservation memory is not limited to the terminal storage 109, and may be provided in the terminal RAM 103, and may be other memories (not illustrated). The execution memory and the preservation memory may employ a physically identical memory, and may be used as appropriate so as to be differentiated from each other depending on an application.

Here, in step S205, since processing based on the game image display program is finished in a case where the information regarding the game image display program is excluded, the terminal CPU 101 may perform the processes in step S206 and the subsequent steps. In this case, it is determined whether or not the information regarding the game image display program developed for execution is excluded from the execution memory in step S206, and, in a case where it is determined that the information regarding the game image display program is excluded from the execution memory, the terminal CPU 101 causes the process to proceed to step S207.

In step S207, the terminal CPU 101 determines suspension of the game image display program, and transmits a suspension signal to the server apparatus 200. In the present embodiment, the suspension signal may be a signal including information indicating that processes related to the game image display program are suspended in the terminal CPU 101 or a signal including IDs or the like defined in advance between the terminal apparatus 100 and the server apparatus 200.

In a case where the terminal apparatus 100 is a smart phone or the like, an incoming call response program for calling is processed with the highest priority. Thus, in a case where there is an incoming call in the smart phone or the like, the incoming call response program undergoes a foreground process, other programs undergo a background process, and thus display of the game image is suspended even in a case where the user is playing a game. Therefore, the determination process in step S205 is useful in order to appropriately preserve a progress situation of the game at the time of the suspension.

The game image display program may have a temporary suspension (pause) function using the user's operation. In this case, the suspension signal in step S207 may be transmitted to the server apparatus 200 on the basis of a temporary suspension request using the user's operation.

In step S201, the case where processing based on the game image display program is required to be forced to be suspended on the basis of determination of the terminal CPU 101 may be, for example, a case where the terminal apparatus 100 transitions to a sleep mode or a case where an interruption process occurs according to a response to an incoming call. In the present embodiment, the processes in steps S201, S202 and step S204 are not necessarily be required to be included in the processes related to the game image display program.

<6. Game Image Generation/Transmission Process (1)>

Figure 8:
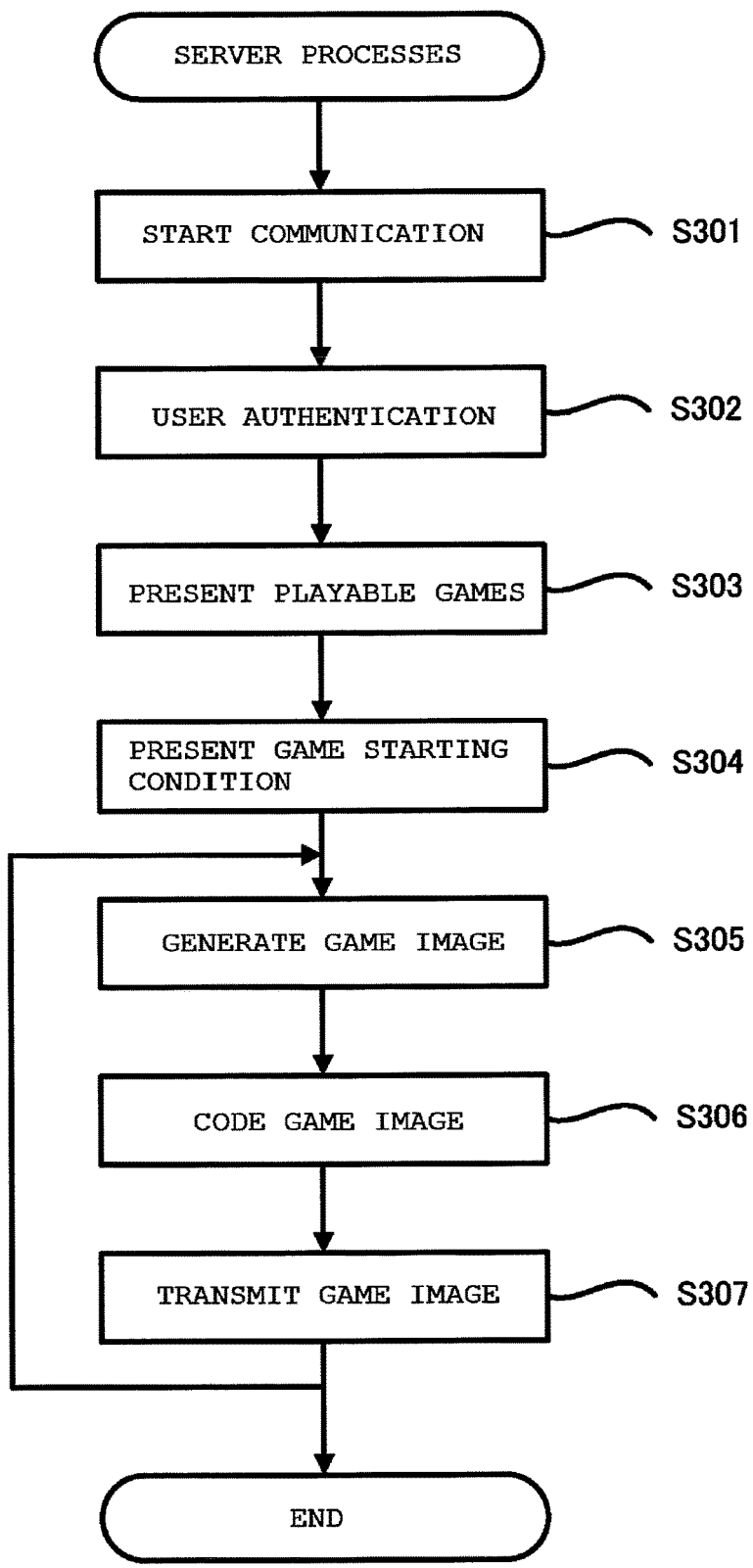
FIG. 8 is a flowchart exemplifying a game image generation/transmission process performed by the server apparatus according to the embodiment of the present invention.

A description will be made of specific processes of a game image generation/transmission process performed by the server apparatus 200 with reference to a flowchart of FIG. 8. Processes corresponding to the flowchart may be realized by the server CPU 201 reading a corresponding processing program stored in, for example, the server ROM 202, and developing the program in the server RAM 203, and executing the program. This game image generation/transmission process may be installed in a launcher program which executes a game program on the server apparatus 200, and may be a program for performing processes in parallel to the launcher program.

The present embodiment will be described assuming that the server apparatus 200 provides a game image in a form of coded moving image data to the terminal apparatus 100.

In step S301, the server CPU 201 performs communication with the terminal apparatus 100 via the server communication unit 208 so as to check interconnection, and causes the process to proceed to step S302.

In step S302, the server CPU 201 performs user authentication on the basis of login information received from the terminal apparatus 100. Specifically, the server CPU 201 compares a user ID and a password preserved in the server storage 207 or the like with the login information received from the terminal apparatus 100, and performs authentication as logging in performed by the user who is provided with a service if matching therebetween occurs.

In step S303, the server CPU 201 acquires history information regarding registration or purchase performed by the authenticated user from the server storage 207 or the like, so as to create a presentation list of game programs which can be provided, transmits the list to the terminal apparatus 100, and causes the process to proceed to step S304.

In step S304, the server CPU 201 acquires information regarding a selected game program from the terminal apparatus 100, determines a game starting condition for the game program, transmits information regarding the starting condition to the terminal apparatus 100, and causes the process to proceed to step S305.

Specific game starting conditions in step S304 are, which will be described in detail later, conditions in which, in a case a game is started from the beginning, in a case where there is saved data at a savepoint, the game is started from the savepoint, and in a case where there is suspended data, the game is started from the suspended data. In a case where there are a plurality of items of saved data or suspended data, any one thereof may be selected. Here, the above-described saved data or suspended data is assumed to be stored in the server storage 207 or the like.

In step S305, the server CPU 201 starts to execute the game program selected from the terminal apparatus 100. Specifically, the server CPU 201 activates the game program, and instructs the server GPU 204 to generate an image as necessary. Consequently, the server CPU 201 generates a game image as a result of processing the game program.

In step S306, the server CPU 201 instructs the server coding unit 206 to perform a coding process on the rendered game image, and thus generates coded moving image data. The server CPU 201 causes the process to proceed to step S307.

In step S307, the server CPU 201 transmits the coded moving image data generated in step S307 to the server communication unit 208, and transmits the data to the terminal apparatus 100. Then, the server CPU 201 performs looping of the processes in steps S305 to S307 in the game image generation/transmission process, and transmits coded moving image data to the server communication unit 208 as long as a game image is continuously generated. In the processes steps S305 to S307, coded moving image data is generated every several frames and is coded.

<7. Game Program Temporary Suspension Process (1)>

Figure 9:
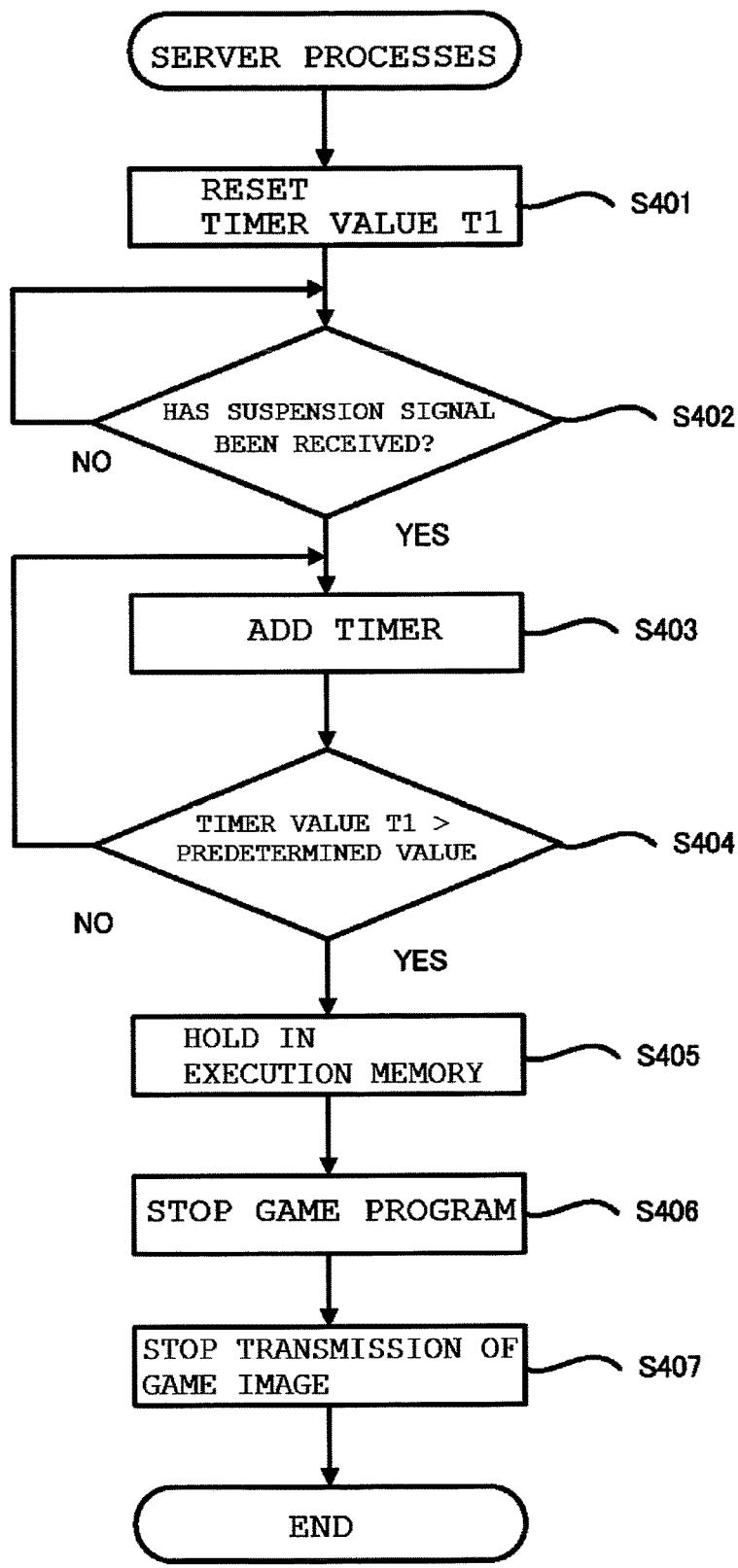
FIG. 9 is a flowchart exemplifying a game program temporary suspension process performed by the server apparatus according to the embodiment of the present invention.

A description will be made of specific processes of a game program temporary suspension process performed by the server apparatus 200 with reference to a flowchart of FIG. 9. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal from the terminal apparatus 100. The following description will be made assuming that the game image display program described in FIG. 4, the program for transmitting a suspension signal described in FIG. 5, and a program for transmitting another suspension signal, which will be described later, are operating in the terminal apparatus 100.

In step S401, the server CPU 201 resets a timer value T1 to 0, and causes the process to proceed to step S402.

In step S402, the server CPU 201 determines whether or not a suspension signal has been received from the terminal apparatus 100 via the server communication unit 208. In a case where it is determined that the suspension signal has not been received, the server CPU 201 repeats step S402 again. On the other hand, in a case where it is determined that the suspension signal has been received, the server CPU 201 causes the process to proceed to step S403.

In step S403, the server CPU 201 adds a numerical value corresponding to elapsed time to the timer value T1, and causes the process to proceed to step S404.

In step S404, the server CPU 201 determines whether or not the timer value T1 exceeds a predetermined value, and performs the process in step S403 again in a case where it is determined that the timer value does not exceed the predetermined value. On the other hand, in a case where it is determined that the timer value T1 exceeds the predetermined value, the server CPU 201 determines that a predetermined period of time has elapsed, and causes the process to proceed to step S405.

In step S405, the server CPU 201 performs a process of holding information in the execution memory related to the currently executed game program in response to a request from the terminal apparatus 100. In other words, the CPU 201 holds the content of the game program developed in the server RAM 203 or the server VRAM 205. The server CPU 201 causes the process to proceed to step S406. In step S405, the server CPU 201 adds the holding time point to information regarding the held game program as a suspension time point, and sets the information as suspended data.

Here, in the present embodiment, the term "holding" indicates that the memory content is not moved from the execution memory to the preservation memory and the content of the execution memory is kept remain in the execution memory, that is, in the server apparatus 200, the information regarding the game program in the server RAM 203 or the server VRAM 205 is not moved to the server storage 207 and is kept remain in the server RAM 203 or the server VRAM 205. In the present embodiment, the information regarding the game program in the server VRAM 205 can be generated again, and may thus be held preliminarily.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

For example, the server RAM 201 or the server VRAM 205 is used as the execution memory, and the capacity thereof is finite. Therefore, if a plurality of programs are developed in the server RAM 201, the capacity thereof is exceeded, and thus information regarding a program or data is appropriately moved to the server storage 207 which is the preservation memory.

The preservation memory is not limited to the server storage 207, and may be provided in the server RAM 203 or the server VRAM 205, and may be other memories (not illustrated). The execution memory and the preservation memory may employ a physically identical memory, and may be used as appropriate so as to be differentiated from each other depending on an application.

Here, holding in the execution memory will be described in detail. Regarding the holding in the execution memory, there is a case where the content of the server RAM 203 or the server VRAM 205 is held in the server RAM 203 or the server VRAM 205 as it is when it is determined that a predetermined period of time has elapsed in step S404. The server RAM 203 records a main body of the game program and a progress situation of the game program, or coded moving image data which is currently being buffered, and the server VRAM 205 records information regarding game image data which is currently being rendered.

In other words, the server CPU 201 causes all memory information of a game program which is currently being executed in the server apparatus 200 to be held along with a progress situation of a game. More specifically, the server CPU performs a process of holding all memory spaces for a selected game program, which are secured by a launcher. Information regarding game image data which is currently being rendered in the server VRAM 205 can be generated again, and is assumed to be held preliminarily in order to quicken a process on a game image right after the game is resumed.

The server CPU 201 stops processing on the game program in step S406, and stops transmission of coded moving image data to the terminal apparatus 100 in step S407.

The predetermined period of time in step S404 is, for example, 0 minutes. In this case, a progress situation of the game program can be instantly held.

The predetermined period of time in step S404 is set to, for example, about 30 minutes. This is because, even in a case where the game image display program is temporarily suspended in the terminal apparatus 100, the game image display program may be immediately resumed. For example, if a process of moving the memory information from the execution memory to the preservation memory is started as soon as a suspension signal is received from the terminal apparatus 100, there is concern that a game image transmission process may be late since it takes time to develop the memory information in the memory during reactivation which will be described later.

Regarding the process in step S405, since the preservation memory frequently uses a memory whose processing speed is lower than that of the execution memory, the predetermined period of time in step S404 is preferably set to appropriate time so that the temporary suspension process does not frequently occur.

In the above-described process flow, in a case where it is determined that communication between the terminal apparatus 100 and the server apparatus 200 cannot be performed due to degradation of a communication situation with the terminal apparatus 100, the server CPU 201 may perform the processes in steps S405 to step S407. Also in this case, the server CPU may wait for the memory information to be held in the execution memory until a predetermined period of time elapses from the time when it is determined that communication cannot be performed as described above.

<8. Game Program Temporary Suspension Process (2)>

Figure 10:
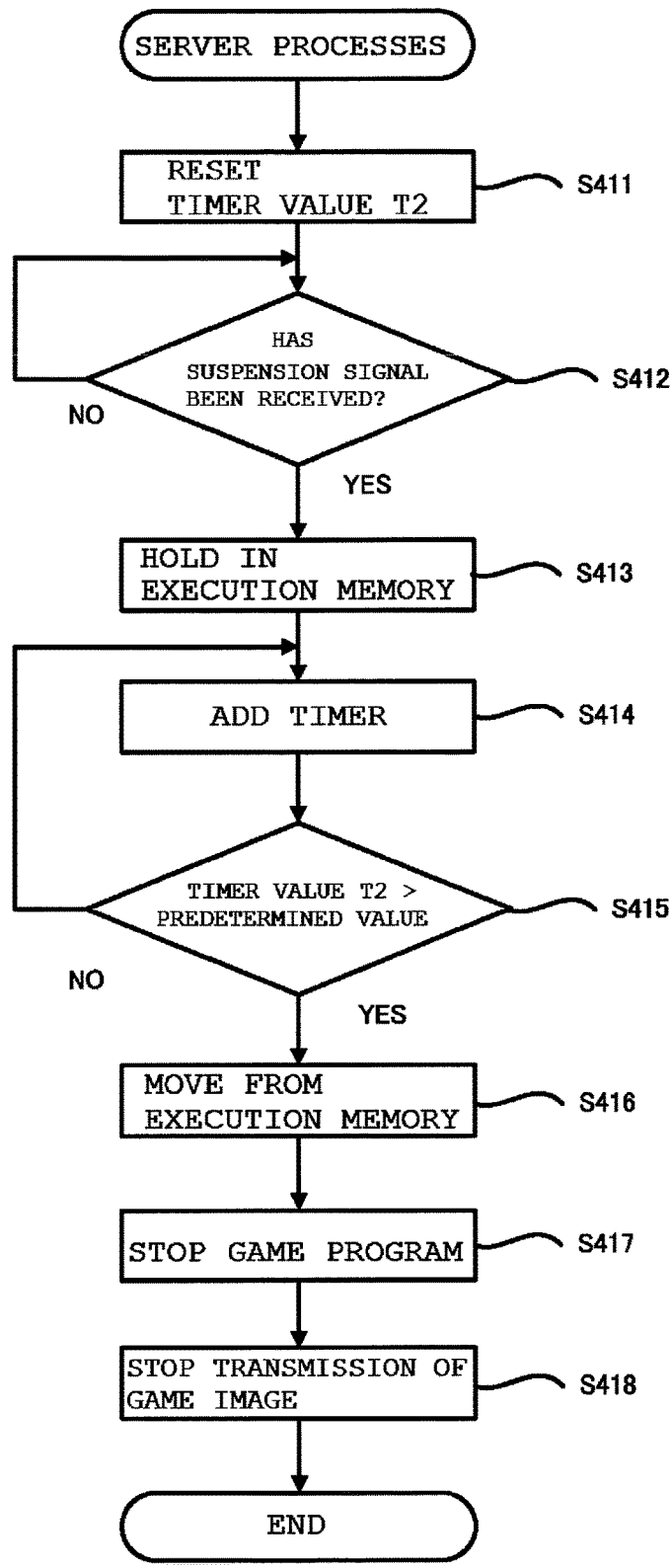
FIG. 10 is another flowchart exemplifying a game program temporary suspension process performed by the server apparatus according to the embodiment of the present invention.

A description will be made of specific processes of a game program temporary suspension process performed by the server apparatus 200 with reference to a flowchart of FIG. 10. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal from the terminal apparatus 100. The following description will be made assuming that the game image display program described in FIG. 4, the program for transmitting a suspension signal described in FIG. 5, and a program for transmitting another suspension signal, which will be described later, are operating in the terminal apparatus 100.

In step S411, the server CPU 201 resets a timer value T2 to 0, and causes the process to proceed to step S412.

In step S412, the server CPU 201 determines whether or not a suspension signal has been received from the terminal apparatus 100 via the server communication unit 208. In a case where it is determined that the suspension signal has not been received, the server CPU 201 repeats step S412 again. On the other hand, in a case where it is determined that the suspension signal has been received, the server CPU 201 causes the process to proceed to step S413.

In step S413, the server CPU 201 performs a process of holding information in the execution memory related to the currently executed game program in response to a request from the terminal apparatus 100. In other words, the CPU 201 holds the content of the game program developed in the server RAM 203 or the server VRAM 205. The server CPU 201 causes the process to proceed to step S414. Information regarding game image data which is currently being rendered in the server VRAM 205 can be regenerated, and may thus be held preliminarily in order to quicken a process on a game image right after the game is resumed.

Here, in the present embodiment, the term "holding" indicates that the memory content is not moved from the execution memory to the preservation memory and the content of the execution memory is kept remain in the execution memory, that is, in the server apparatus 200, the information regarding the game program in the server RAM 203 or the server VRAM 205 is not moved to the server storage 207, and is kept remain along with address information, in the server RAM 203 or the server VRAM 205.

In step S414, the server CPU 201 adds a numerical value corresponding to elapsed time to the timer value T2, and causes the process to proceed to step S415.

In step S415, the server CPU 201 determines whether or not the timer value T2 exceeds a predetermined value, and performs the process in step S414 again in a case where it is determined that the timer value does not exceed the predetermined value. On the other hand, in a case where it is determined that the timer value T2 exceeds the predetermined value, the server CPU 201 determines that a predetermined period of time has elapsed, and causes the process to proceed to step S416.

In step S416, the server CPU 201 performs a process of moving the information in the execution memory related to the currently executed game program in response to a request from the terminal apparatus 100. In other words, the CPU 201 moves the content of the game program developed in the server RAM 203 or the server VRAM 205 to the server storage 207. The server CPU 201 causes the process to proceed to step S417. In step S416, the server CPU 201 adds the movement time point to information regarding the moved game program as a suspension time point, and sets the information as suspended data.

Here, in the present embodiment, the term "movement" indicates that the memory content is copied from the execution memory to the preservation memory as it is, so that the memory content of the execution memory is opened, that is, in the server apparatus 200, the information regarding the game program in the server RAM 203 or the server VRAM 205 is copied to the server storage 207 as it is, and thus the information regarding the game program in the server RAM 203 or the server VRAM 205 is opened.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

For example, the server RAM 201 or the server VRAM 205 is used as the execution memory, and the capacity thereof is finite. Therefore, if a plurality of programs are developed in the server RAM 201, the capacity thereof is exceeded, and thus information regarding a program or data is appropriately moved to the server storage 207 which is the preservation memory.

The preservation memory is not limited to the server storage 207, and may be provided in the server RAM 203 or the server VRAM 205, and may be other memories (not illustrated). The execution memory and the preservation memory may employ a physically identical memory, and may be used as appropriate so as to be differentiated from each other depending on an application.

Here, the movement from the execution memory to the preservation memory will be described in detail. The movement from the execution memory to the preservation memory occurs in a case where the content of the server RAM 203 or the server VRAM 205 is moved to the server storage 207 when it is determined that the predetermined period of time has elapsed in step S415. The server RAM 203 records a main body of the game program and a progress situation of the game program, or coded moving image data which is currently being buffered, and the server VRAM 205 records information regarding game image data which is currently being rendered.

In other words, the server CPU 201 causes all memory information of a game program which is currently being executed in the server apparatus 200 to be moved to the server storage 207 along with a progress situation of a game. More specifically, the server CPU performs a process of moving all memory spaces for a selected game program, which are secured by a launcher program, to the server storage 207. Information regarding game image data which is currently being rendered in the server VRAM 205 can be regenerated, and is assumed to be preliminarily moved to the server storage 207 in order to quicken a process on a game image right after the game is resumed.

The server CPU 201 stops processing on the game program in step S417, and stops transmission of coded moving image data to the terminal apparatus 100 in step S418.

The predetermined period of time in step S415 is, for example, 0 minutes. In this case, information regarding the game program can be instantly moved.

The predetermined period of time in step S415 is set to, for example, about 30 minutes. This is because, even in a case where the game image display program is temporarily suspended in the terminal apparatus 100, the game image display program may be immediately resumed. For example, if a process of moving the memory information from the execution memory to the preservation memory is started as soon as a suspension signal is received from the terminal apparatus 100, there is concern that a game image transmission process may be late since it takes time to develop the memory information in the memory during reactivation which will be described later.

Regarding the process in step S416, since the preservation memory frequently uses a memory whose processing speed is lower than that of the execution memory, the predetermined period of time in step S415 is preferably set to appropriate time so that the temporary suspension process does not frequently occur.

In the above-described process flow, in a case where it is determined that communication between the terminal apparatus 100 and the server apparatus 200 cannot be performed due to degradation of a communication environment with the terminal apparatus 100, the server CPU 201 may perform the process in step S413 or the processes in steps S416 to step S418. Also in this case, the server CPU may wait for the memory information to be moved from the execution memory to the preservation memory until a predetermined period of time elapses from the time when it is determined that communication cannot be performed as described above.

<9. Game Program Resuming Process (1)>

Figure 11:
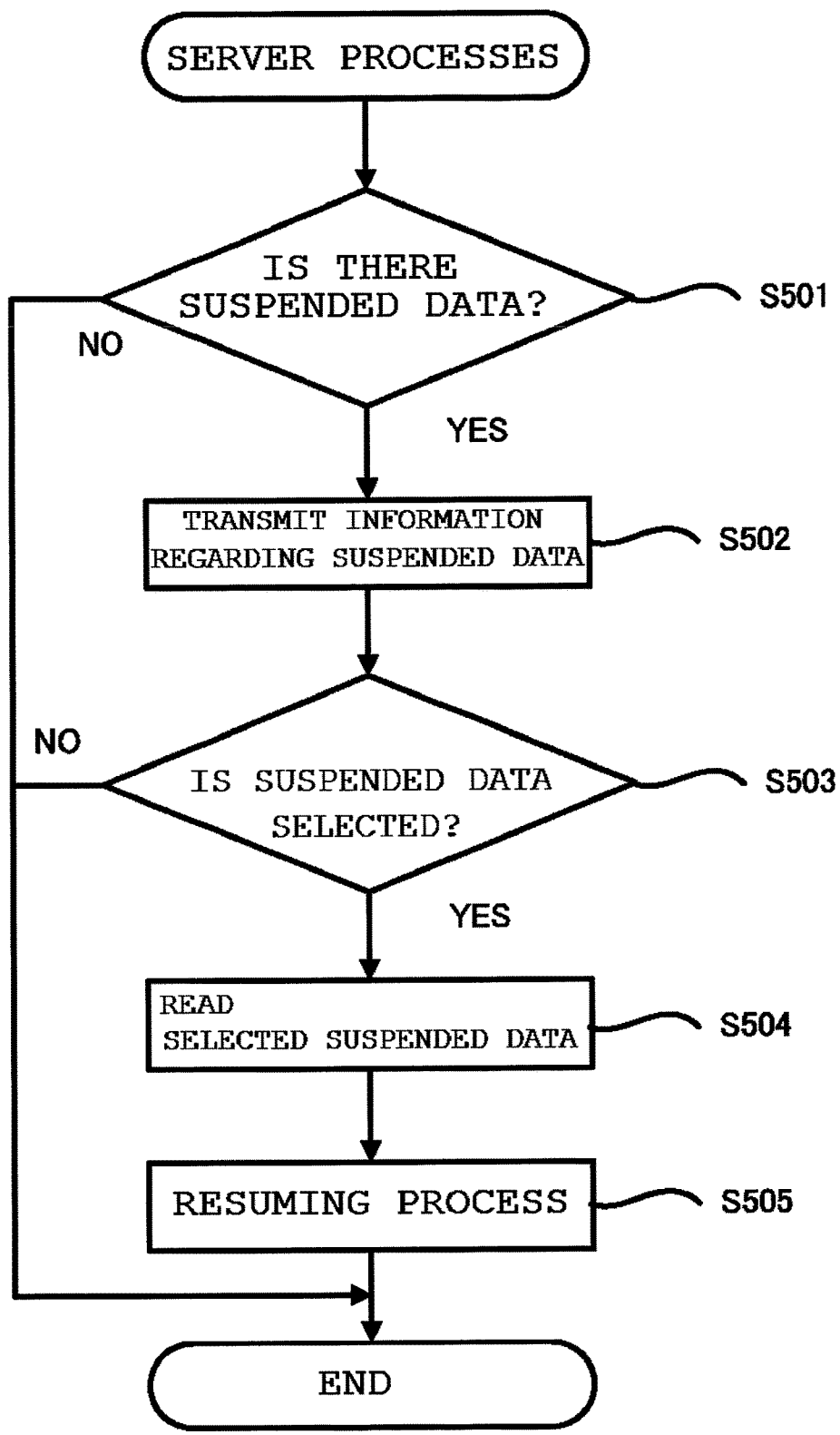
FIG. 11 is a flowchart exemplifying a game program resuming process performed by the server apparatus according to the embodiment of the present invention.

A description will be made of specific processes of a game program resuming process performed by the server apparatus 200 with reference to a flowchart of FIG. 11. Processes corresponding to the flowchart may be realized by the server CPU 201 reading a corresponding processing program stored in, for example, the server ROM 202, and developing the program in the server RAM 203, and executing the program. The following description will be made assuming that the game image display program described in FIG. 4 is operating in the terminal apparatus 100.

In step S501, the server CPU 201 determines whether or not there is suspended data with respect to a game program to be activated in response to a request from the terminal apparatus 100, and finishes the process in a case where it is determined that there is no suspended data in the server storage 207. On the other hand, in a case where it is determined that there is suspended data, the server CPU 201 causes the process to proceed to step S502.

In step S502, the server CPU 201 transmits a suspension time point or the like to the terminal apparatus 100 as information regarding the suspended data. Here, in a case where there are a plurality of items of suspended data, information regarding all the items of suspended data may be transmitted, and information regarding the latest suspended data may be transmitted. Hereinafter, a description will be made of a case where there are a plurality of items of suspended data. The server CPU 201 transmits the information regarding the suspended data to the terminal apparatus 100, and causes the process to proceed to step S503.

In step S503, in a case where information regarding suspended data which is selected is obtained from the terminal apparatus 100, the server CPU 201 causes the process to proceed to step S504, and in a case where suspended data is not selected, the server CPU finishes the process.

In step S504, the server CPU 201 reads the selected suspended data from the server storage 207, develops the data in the server RAM 203 and the server VRAM 205, and thus reproduces a progress situation of the game program corresponding to the suspended data in a state of being temporarily suspended. In a case where there is no data developed in the server VRAM 205, and an image is required to be rendered in the server GPU 204, the CPU 201 instructs the server GPU 204 to render a game image again, and thus causes the server GPU 204 to regenerate a game image in the server VRAM 205 at the time of being temporarily suspended.

In step S505, the server CPU 201 resumes the process on the game program developed in the server RAM 203 and the server VRAM 205.

As mentioned above, since the server apparatus 200 can perform a restoring process by using suspended data, a progress situation of a game program when a suspension signal is received can be preserved without using a save function based on a savepoint specific to the game program, and thus the existing game program cannot be required to be modified.

As described above, in the interactive system of the present embodiment, it is possible to appropriately preserve a progress situation of a game program executed by the server apparatus in response to a request from the terminal apparatus.

In the interactive system of the present embodiment, a progress situation of a game program can be preserved even in a case where a permitted condition (so-called savepoint) does not occur during execution of the game program.

In the interactive system of the present embodiment, in a case of a game program used in a local environment which is not compatible with a network, a progress situation can be arbitrarily preserved without rewriting the game program, and thus it is possible to provide a very useful service.

The present invention is not limited to the above-described embodiment, and is applicable to an interactive system in which a processing result of a program executed by a server apparatus in response to an input operation on a terminal apparatus performed by a user is provided to the terminal apparatus, and the server apparatus continuously repeatedly executes the program in response to an input operation on the terminal apparatus performed by the user. For example, the present invention is applicable to providing of processing on an existing application program using an emulator, or providing of a service such as a virtual machine (VM).

<10. Game Program Resuming Process (2)>

Figure 12:
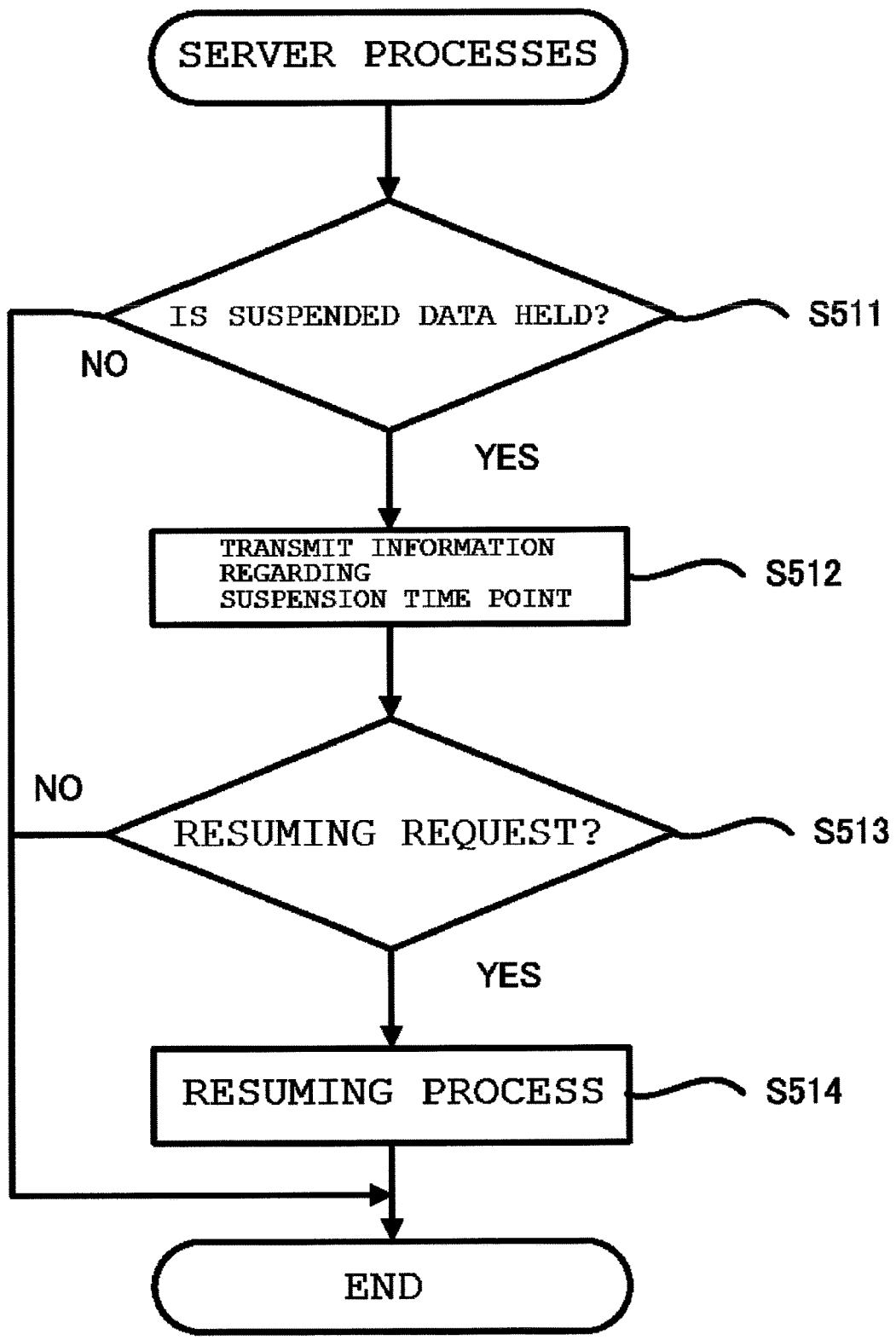
FIG. 12 is another flowchart exemplifying a game suspension signal transmission process performed by the terminal apparatus according to the embodiment of the present invention.

A description will be made of specific processes of a game program resuming process performed by the server apparatus 200 with reference to a flowchart of FIG. 12. Processes corresponding to the flowchart may be realized by the server CPU 201 reading a corresponding processing program stored in, for example, the server ROM 202, and developing the program in the server RAM 203, and executing the program. The following description will be made assuming that the game image display program described in FIG. 4 is operating in the terminal apparatus 100.

In step S511, the server CPU 201 determines whether or not there is suspended data of a game program in the server RAM 203 and the server VRAM 205 which are execution memories with respect to the game program to be activated in response to a request from the terminal apparatus 100, and finishes the process in a case where it is determined that there is no suspended data in the server RAM 203 and the server VRAM 205. On the other hand, in a case where it is determined that there is suspended data of the game program in the server RAM 203 and the server VRAM 205, the server CPU 201 causes the process to proceed to step S512. Information regarding game image data which is currently being rendered in the server VRAM 205 can be generated again and thus is not necessarily required to be held.

In step S512, the server CPU 201 transmits a suspension time point or the like as information held in the execution memories, to the terminal apparatus 100, and causes the process to proceed to step S513. Consequently, the user operating the terminal apparatus 100 can know the suspension time point or the like, and can thus obtain an index for determining whether or not the game program is resumed from the suspended data held in the execution memories.

In step S513, the server CPU 201 causes the process to proceed to step S514 in a case where a request for resuming the game program from the suspended data held in the execution memories is received from the terminal apparatus 100, and finishes the process in a case where there is no request for resuming the game program from the suspended data held in the execution memories.

In step S514, the server CPU 201 reproduces a progress situation of the game program held in the server RAM 203 and the server VRAM 205. Consequently, the server CPU 201 resumes processing on the game program held in the server RAM 203 and the server VRAM 205. Information regarding game image data which is currently being rendered in the server VRAM 205 can be generated again and thus is not necessarily required to be held. Specifically, in a case where there is no data developed in the server VRAM 205, and an image is required to be rendered in the server GPU 204, the server CPU 201 performs a process of instructing the server GPU 204 to render a game image again, and thus causing the server GPU 204 to regenerate a game image in the server VRAM 205 at the time of being temporarily suspended.

As mentioned above, since the game program is resumed from a state of being held in the execution memories in the server apparatus 200, a progress situation of a game program when a suspension signal is received can be preserved without using a save function based on a savepoint specific to the game program, and thus the existing game program cannot be required to be modified.

As described above, in the interactive system of the present embodiment, it is possible to appropriately preserve a progress situation of a game program executed by the server apparatus in response to a request from the terminal apparatus.

In the interactive system of the present embodiment, a progress situation of a game program can be preserved even in a case where a permitted condition (so-called savepoint) does not occur during execution of the game program.

In the interactive system of the present embodiment, in a case of a game program used in a local environment which is not compatible with a network, a progress situation can be arbitrarily preserved without rewriting the game program, and thus it is possible to provide a very useful service.

The present invention is not limited to the above-described embodiment, and is applicable to an interactive system in which a processing result of a program executed by a server apparatus in response to an input operation on a terminal apparatus performed by a user is provided to the terminal apparatus, and the server apparatus continuously repeatedly executes the program in response to an input operation on the terminal apparatus performed by the user. For example, the present invention is applicable to providing of processing on an existing application program using an emulator, or providing of a service such as a virtual machine (VM).

<11. Game Suspension Signal Generation/Transmission Process (2)>

Figure 13:
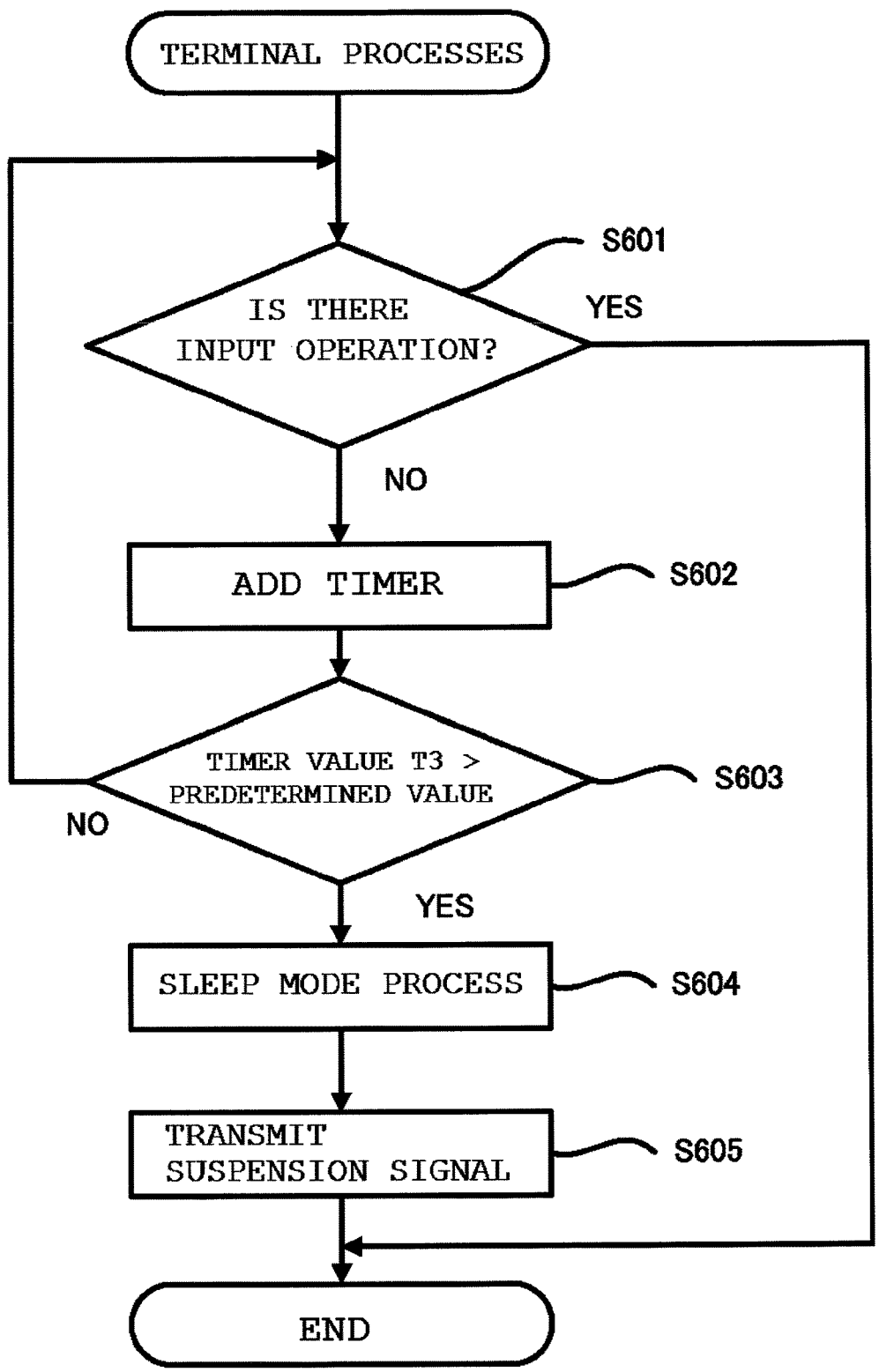
FIG. 13 is another flowchart exemplifying a game image generation/transmission process performed by the server apparatus according to the embodiment of the present invention.

A description will be made of specific processes of another example of the game suspension signal generation/transmission process performed by the terminal apparatus 100 of the present embodiment with reference to a flowchart of FIG. 13. Processes corresponding to the flowchart may be realized by the terminal CPU 101 reading a corresponding processing program stored in, for example, the terminal ROM 102, and developing the program in the terminal RAM 103, and executing the program. This game suspension signal generation/transmission process is performed in parallel to the processes in steps S106 to S108 related to the game image display program illustrated in FIG. 4.

In step S601, the terminal CPU 101 determines whether or not an input operation on the input operation unit 107 has been performed by a user. In a case where it is determined that the input operation on the input operation unit 107 has not been performed by the user, the terminal CPU 101 causes the process to proceed to step S602. On the other hand, in a case where it is determined that the input operation on the input operation unit 107 has been performed by the user, the terminal CPU 101 finishes the process.

In step S602, the terminal CPU 101 adds a numerical value corresponding to elapsed time to a timer value T3, and causes the process to proceed to step S603.

In step S603, the terminal CPU 101 determines whether or not the timer value T3 exceeds a predetermined value, and performs the process in step S601 again in a case where it is determined that the timer value does not exceed the predetermined value. On the other hand, in a case where it is determined that the timer value T3 exceeds the predetermined value, the terminal CPU 101 determines that the user's input operation is not performed for a predetermined period of time, and causes the process to proceed to step S604.

In step S604, since it can be determined that the user is not playing a game, for example, the operating system (OS) side operated by the terminal CPU 101 instructs the game image display program side which is an application program to enter a sleep mode, and thus the application program is brought into the sleep mode, the terminal CPU 101 causes the process to proceed to step S605. The terminal CPU 101 keeps the game image display program in the sleep mode until the sleep mode is canceled by programs other than the application program entering the sleep mode, for example, a watchdog program.

In step S605, the terminal CPU 101 transmits a suspension signal to the server apparatus 200. In the present embodiment, the suspension signal may be a signal including information indicating that the processes related to the game image display program are suspended in the terminal CPU 101 or a signal including IDs or the like defined in advance between the terminal apparatus 100 and the server apparatus 200.

The processes in steps S604 and S605 may be replaced with each other, and may be performed at the same time.

In a case where a shutdown process is performed by pressing a power button through an operation on the operation input unit 107 or the like of the terminal apparatus 100, the terminal CPU 101 may transmit a suspension signal to the server apparatus 200 before shutting down the terminal apparatus 100. In addition to the presence or absence of the above-described user's input, the terminal CPU 101 may generate a suspension signal and may transmit the suspension signal to the server apparatus 200, for example, in a case of an incoming call response in which the game image display program is suspended.

<12. Game Suspension Signal Generation/Transmission Process (3)>

Figure 14:
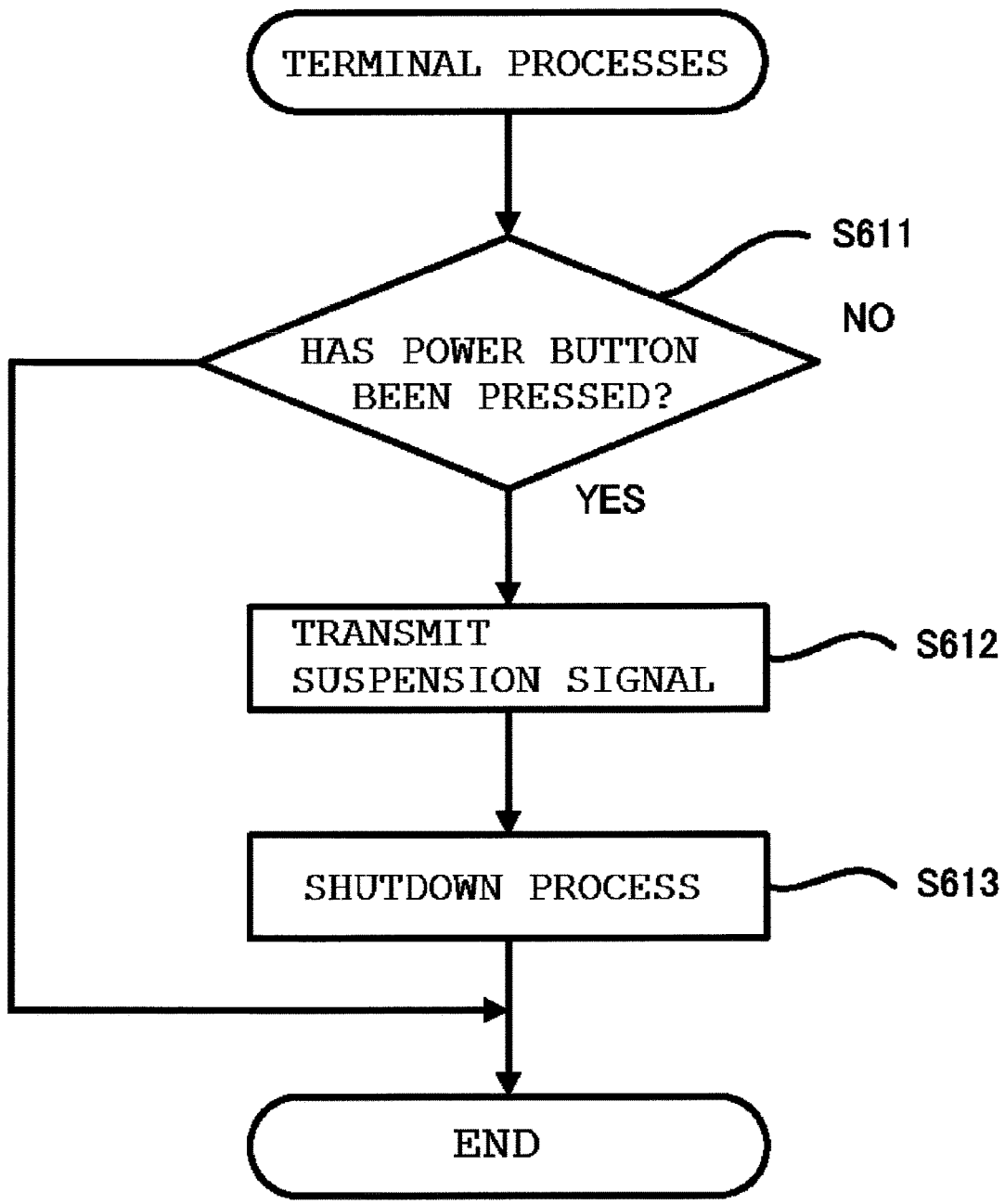
FIG. 14 is another flowchart exemplifying a game program resuming process performed by the server apparatus according to the embodiment of the present invention.

A description will be made of specific processes of still another example of the game suspension signal generation/transmission process performed by the terminal apparatus 100 of the present embodiment with reference to a flowchart of FIG. 14. Processes corresponding to the flowchart may be realized by the terminal CPU 101 reading a corresponding processing program stored in, for example, the terminal ROM 102, and developing the program in the terminal RAM 103, and executing the program. This game suspension signal generation/transmission process is performed in parallel to the processes in steps S106 to S108 related to the game image display program illustrated in FIG. 4. The process is assumed to be repeatedly performed until the power button is pressed.

In step S611, the terminal CPU 101 determines whether or not the power button has been pressed through a user's input operation on the input operation unit 107. In a case where it is determined that the power button has been performed through the user's input operation, the terminal CPU 101 causes the process to proceed to step S612. Here, response processes of the terminal apparatus 100 performed by the operation of pressing the power button are assumed to include a shutdown process and a sleep process. On the other hand, in a case where it is determined that the input operation on the input operation unit 107 has not been performed by the user, the terminal CPU 101 finishes the process. The input operation unit 107 may be provided with a hardware key in addition to the above-described touch panel as the power button, and a signal indicating that the power button has been pressed through a special input operation may be output to the terminal CPU 101.

In step S612, the terminal CPU 101 transmits a suspension signal to the server apparatus 200. In the present embodiment, the suspension signal may be a signal including information indicating that the processes related to the game image display program are suspended in the terminal CPU 101 or a signal including IDs or the like defined in advance between the terminal apparatus 100 and the server apparatus 200.

In step S613, the terminal CPU 101 performs, for example, the shutdown process on the terminal apparatus 100, and finishes the process. Here, the shutdown process indicates that the entire terminal apparatus 100 is powered off by stopping processes of the terminal CPU 101, but may include a case where some constituent elements are continuously operated inside the terminal apparatus 100. In the same manner as in step S604 described in FIG. 13, the OS side may instruct the game image display program side to enter a sleep mode, and thus the game image display program may be brought into the sleep mode, and then the process may be finished. In this case, a login process as in step S103 described in FIG. 4 is not required to be performed again after restoration from the sleep process, and the game program can be rapidly resumed.

The processes in steps S612 and S613 may be performed in parallel to each other. In other words, the suspension signal transmission process in step S612 may be performed as a part of the shutdown process in step S613.

<13. Game Image Generation/Transmission Process (2)>

Figure 15:
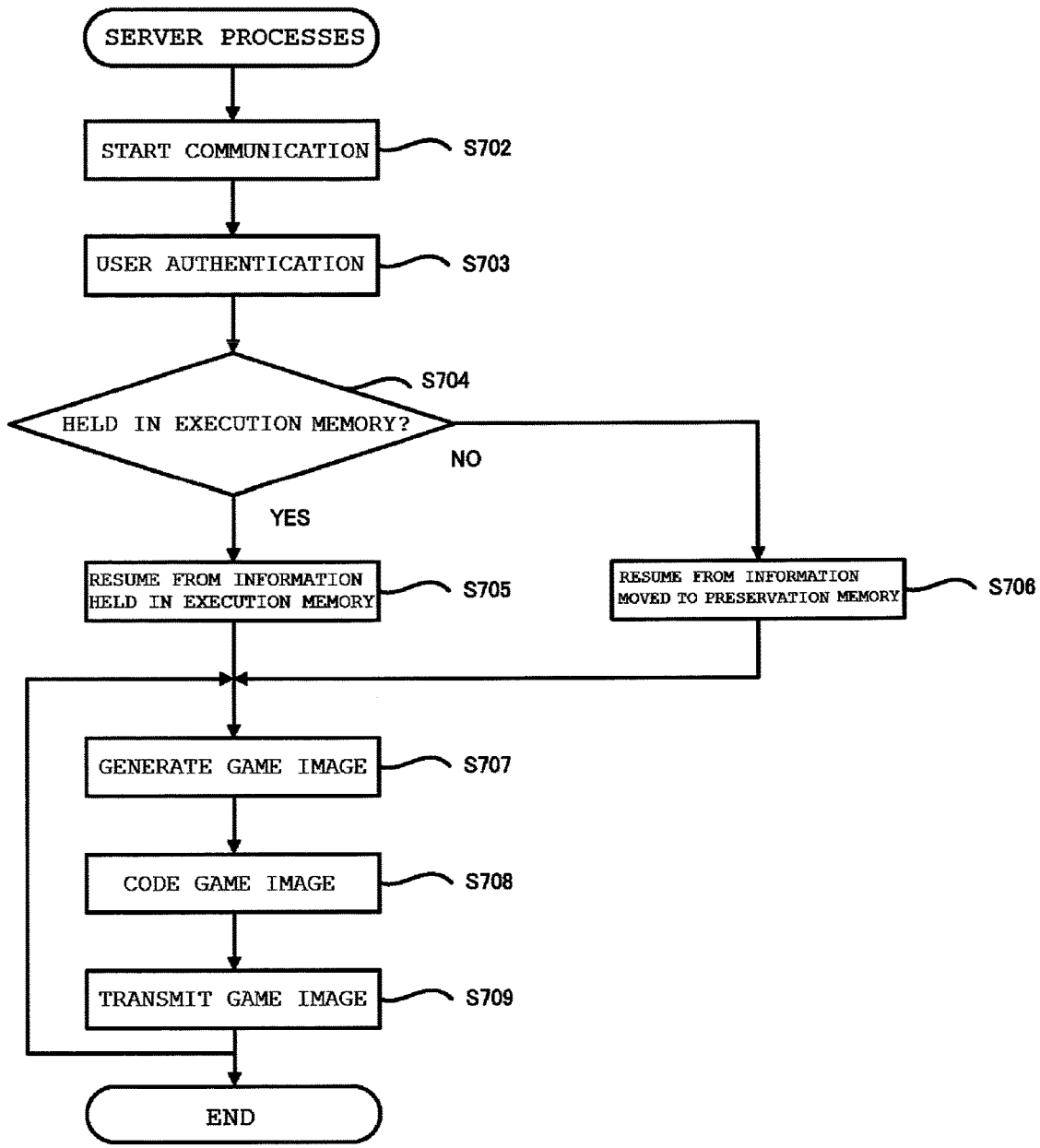
FIG. 15 is still another flowchart exemplifying a game suspension signal transmission process performed by the terminal apparatus according to the embodiment of the present invention.

A description will be made of specific processes of another game image generation/transmission process performed by the server apparatus 200 with reference to a flowchart of FIG. 15. Processes corresponding to the flowchart may be realized by the server CPU 201 reading a corresponding processing program stored in, for example, the server ROM 202, and developing the program in the server RAM 203, and executing the program. A description will be made assuming that the game image generation/transmission process is started, for example, when the server CPU 201 detects that a request for transmission of processing related to a game program and a processing result thereof, provided by the server apparatus 200, has been received from the terminal apparatus 100. This game image generation/transmission process may be installed in a launcher program which performs a game program on the server apparatus 200, and may be a program for performing a parallel process along with the launcher program.

The present embodiment will be described assuming that the server apparatus 200 provides a game image in a form of coded moving image data to the terminal apparatus 100.

In step S702, the server CPU 201 performs communication with the terminal apparatus 100 via the server communication unit 208 so as to check interconnection, and causes the process to proceed to step S703.

In step S703, the server CPU 201 performs user authentication on the basis of login information received from the terminal apparatus 100. Specifically, the server CPU 201 compares a user ID and a password preserved in the server storage 207 or the like with the login information received from the terminal apparatus 100, and performs authentication as logging in performed by the user who is provided with a service if matching therebetween occurs.

In step S704, the server CPU 201 determines whether or not information regarding a game program is held in execution memories, and causes the process to proceed to step S705 in a case where the information is held. The server CPU 201 determines whether or not the information regarding the game program is held in the execution memories, and causes the process to proceed to step S706 in a case where the information is not held. The execution memories mentioned here are assumed to be the server RAM 202 and the server VRAM 205.

In step S705, the server CPU 201 acquires information regarding a previously suspended game program from the execution memories, performs a process of resuming the game program on the basis of the information in the execution memories, and causes the process to proceed to step S707. In other words, through this step, the information regarding the game program is held in the execution memories, and thus it is possible to instantly resume the game program.

On the other hand, in step S706, the server CPU 201 acquires information regarding a previously temporarily suspended game program from a preservation memory such as the server storage 207, develops the information in the preservation memory in the execution memory such as the terminal RAM 203, performs a process of resuming a game on the basis of the developed information in the execution memory, and causes the process to proceed to step S707.

In step S707, the server CPU 201 continuously performs processing on the game program in a seamless manner after the resuming process. Specifically, the server CPU 201 starts a rendering process related to the game program, and instructs the server GPU 204 to generate an image as necessary. Consequently, the server CPU 201 generates a game image as a result of processing on the game image. In a case where data to be developed in the server VRAM 205 is held in the execution memory or is moved to the preservation memory, the server CPU 201 instructs the server GPU 204 to generate an image so that the image is connected to the data held in the execution memory or moved to the preservation memory.

In step S708, the server CPU 201 instructs the server coding unit 206 to perform a coding process on the rendered game image, so as to generate coded moving image data. The server CPU 201 causes the process to proceed to step S709.

In step S709, the server CPU 201 transmits the coded moving image data generated in step S708 to the server communication unit 208, and transmits the data to the terminal apparatus 100.

Hereinafter, the server CPU 201 executes the game program so as to perform a usual process.

Here, the terminal apparatus 100 is not limited to an apparatus which is initially connected to the server apparatus 200. In other words, even though a portable terminal apparatus such as a smart phone is initially connected to the server apparatus 200, the terminal apparatus 100 operated by a user next may be a game dedicated machine or a personal computer having fast graphic processing performance.

Since there are cases where a user plays a game during movement or the like by using a different terminal apparatus 100, if the game can be continuously played by using the different terminal apparatus 100 within a predetermined period of time when login information matches, the user's convenience can be improved, and can easily continuously enjoy the game while changing the terminal apparatus 100 depending on time or a place.

In a case where the terminal apparatus 100 is a different apparatus as described above, the server apparatus 200 may perform a process in a variable manner depending on a hardware specification of the terminal apparatus 100 as follows.

<14. Game Image Generation/Transmission Process (3)>

Figure 16:
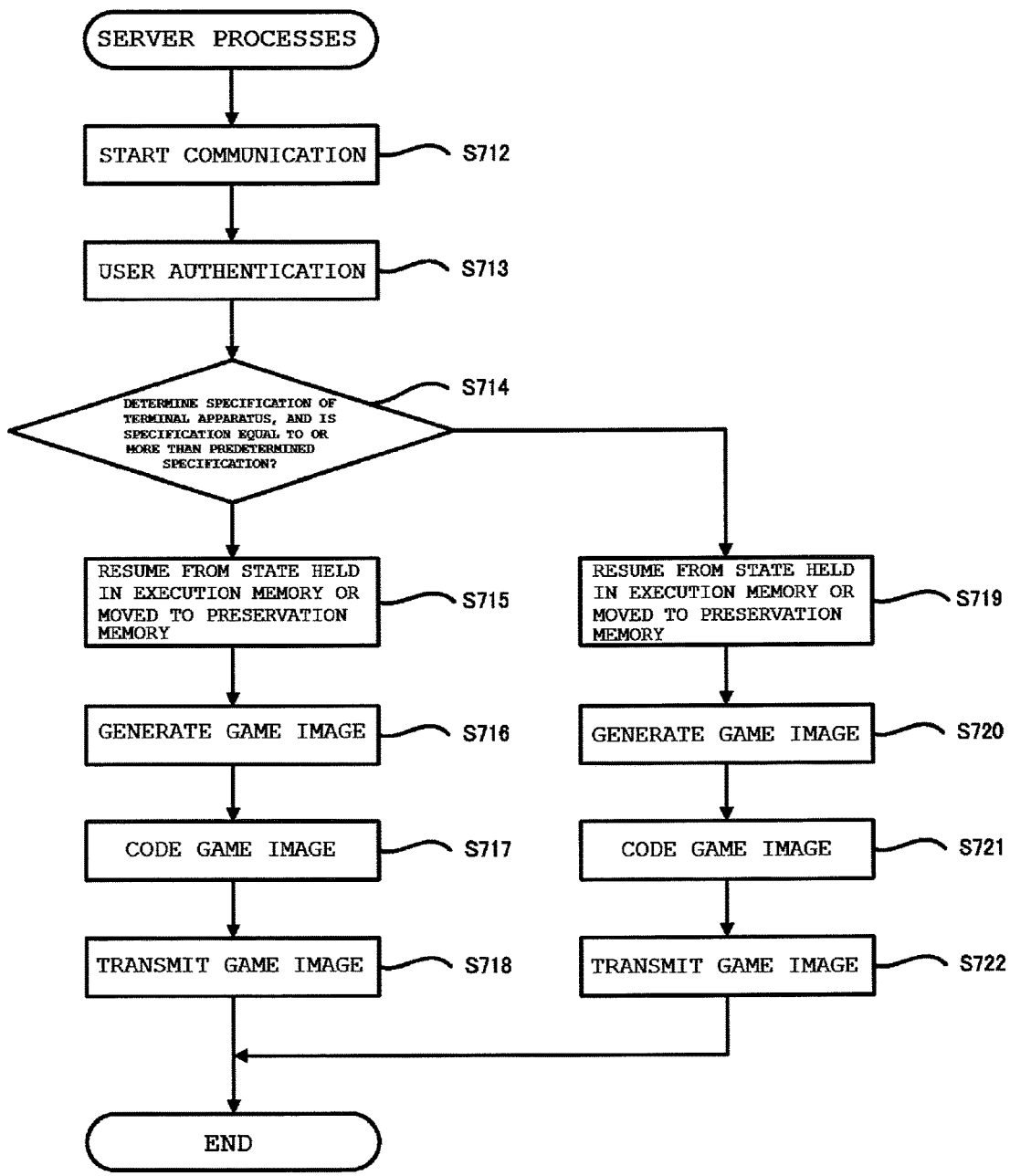
FIG. 16 is still another flowchart exemplifying a game image generation/transmission process performed by the server apparatus according to the embodiment of the present invention.

A description will be made of specific processes of still another game image generation/transmission process performed by the server apparatus 200 with reference to a flowchart of FIG. 16. Processes corresponding to the flowchart may be realized by the server CPU 201 reading a corresponding processing program stored in, for example, the server ROM 202, and developing the program in the server RAM 203, and executing the program. A description will be made assuming that the game image generation/transmission process is started, for example, when the server CPU 201 detects that a request for transmission of processing related to a game program and a processing result thereof, provided by the server apparatus 200, has been received from the terminal apparatus 100. This game image generation/transmission process may be installed in a launcher program which performs a game program on the server apparatus 200, and may be a program for performing a parallel process along with the launcher program.

The present embodiment will be described assuming that the server apparatus 200 provides a game image in a form of coded moving image data to the terminal apparatus 100.

In step S712, the server CPU 201 performs communication with the terminal apparatus 100 via the server communication unit 208 so as to check interconnection, and causes the process to proceed to step S713.

In step S713, the server CPU 201 performs user authentication on the basis of login information received from the terminal apparatus 100. Specifically, the server CPU 201 compares a user ID and a password preserved in the server storage 207 or the like with the login information received from the terminal apparatus 100, and performs authentication as logging in performed by the user who is provided with a service if matching therebetween occurs.

In step S714, the server CPU 201 determines a specification of the terminal apparatus on the basis of terminal specific information received from the terminal apparatus 100. Here, the terminal specific information includes at least one of a model name, a type number, rendering performance, and a CPU processing capability, which are information sufficient to determine a hardware specification. In a case where it is determined that the specification of the terminal apparatus is equal to or less than predetermined performance, the server CPU 201 causes the process to proceed to step S715. On the other hand, in a case where it is determined that the specification of the terminal apparatus is equal to or more than the predetermined performance, the server CPU 201 requests the terminal apparatus 100 to share image rendering and also causes the process to proceed to step S719.

In step S715, the server CPU 201 acquires information regarding a previously temporarily suspended game program from an execution memory or a preservation memory. In a case where there is temporarily suspended information in the preservation memory, the server CPU develops the information in the execution memory, performs a process of resuming a game on the basis of the information in the execution memory, and causes the process to proceed to step S716.

In step S716, the server CPU 201 continuously performs processing on the game program so that the game program is connected to the game program after the resuming process is performed. In other words, in a case where the terminal apparatus 100 is not a game dedicated machine or a personal computer having fast graphic processing performance, the server apparatus 200 performs the entire image generation process, and transmits a generated game image in a streaming mode. In a normal initial setting, a generated game image is transmitted by using the streaming mode. This is also the same for a case where a hardware specification cannot be determined.

In step S717, the server CPU 201 instructs the server coding unit 206 to perform a coding process on the rendered game image, so as to generate coded moving image data. The server CPU 201 causes the process to proceed to step S718.

In step S718, the server CPU 201 transmits the coded moving image data generated in step S717 to the server communication unit 208, and transmits the data to the terminal apparatus 100.

In step S719, the server CPU 201 acquires information regarding a previously temporarily suspended game program from the execution memory or the preservation memory. In a case where there is temporarily suspended information in the preservation memory, the server CPU develops the information in the execution memory, performs a process of resuming a game on the basis of the information in the execution memory, and causes the process to proceed to step S720.

In step S720, the server CPU 201 continuously performs processing on the game program so that the game program is connected to the game program after the resuming process is performed. Here, the server CPU 201 shares a part of the image generation process with the terminal apparatus 100 depending on the hardware specification determined in step S714. In other words, in a case where the terminal apparatus 100 is a game dedicated machine or a personal computer having fast graphic processing performance, the terminal apparatus 100 can perform a part of the image generation process. Therefore, the terminal apparatus 100 shares rendering of at least a location requiring high response performance for a user's input operation, such as locations related to a user interface in a game image which is finally generated. For example, the server GPU 204 renders locations other than the location requiring high response performance for the user's input operation.

In step S721, the server CPU 201 instructs the server coding unit 206 to perform a coding process on the rendered game image, so as to generate coded moving image data. The server CPU 201 causes the process to proceed to step S722.

In step S722, the server CPU 201 transmits the coded moving image data generated in step S721 to the server communication unit 208, and transmits the data to the terminal apparatus 100.

Here, the terminal apparatus 100 renders only a location requiring high response performance for the user's input operation, superimposes a part of the game image rendered by the terminal apparatus 100 on the game image received from the server apparatus 200 so as to generate a final game image. Consequently, the user's input operation can be reflected in the location rendered by the terminal apparatus 100 faster than in a case where the server GPU 204 renders the entire image which is finally generated.

Thereafter, the server CPU 201 performs processing on the game program until the terminal apparatus 100 is changed while the image rendering process is shared between the terminal apparatus 100 and the server apparatus 200.

In a case where the authenticated user is not a user who has performed registration or purchase and is a user (group) to whom publication is permitted in the above-described game image generation/transmission processes (1), (2) and (3), information regarding the group to which publication is permitted may be acquired from the server storage 207 or the like, and a game image may be transmitted to the user to whom publication is permitted. The user to whom publication is permitted may be set as appropriate, such as a guest user or a user who has performed friend registration. This may be used for an application for streaming distribution of a currently played game screen.

<15. Game Program Temporary Suspension Process (3)>

Figure 17:
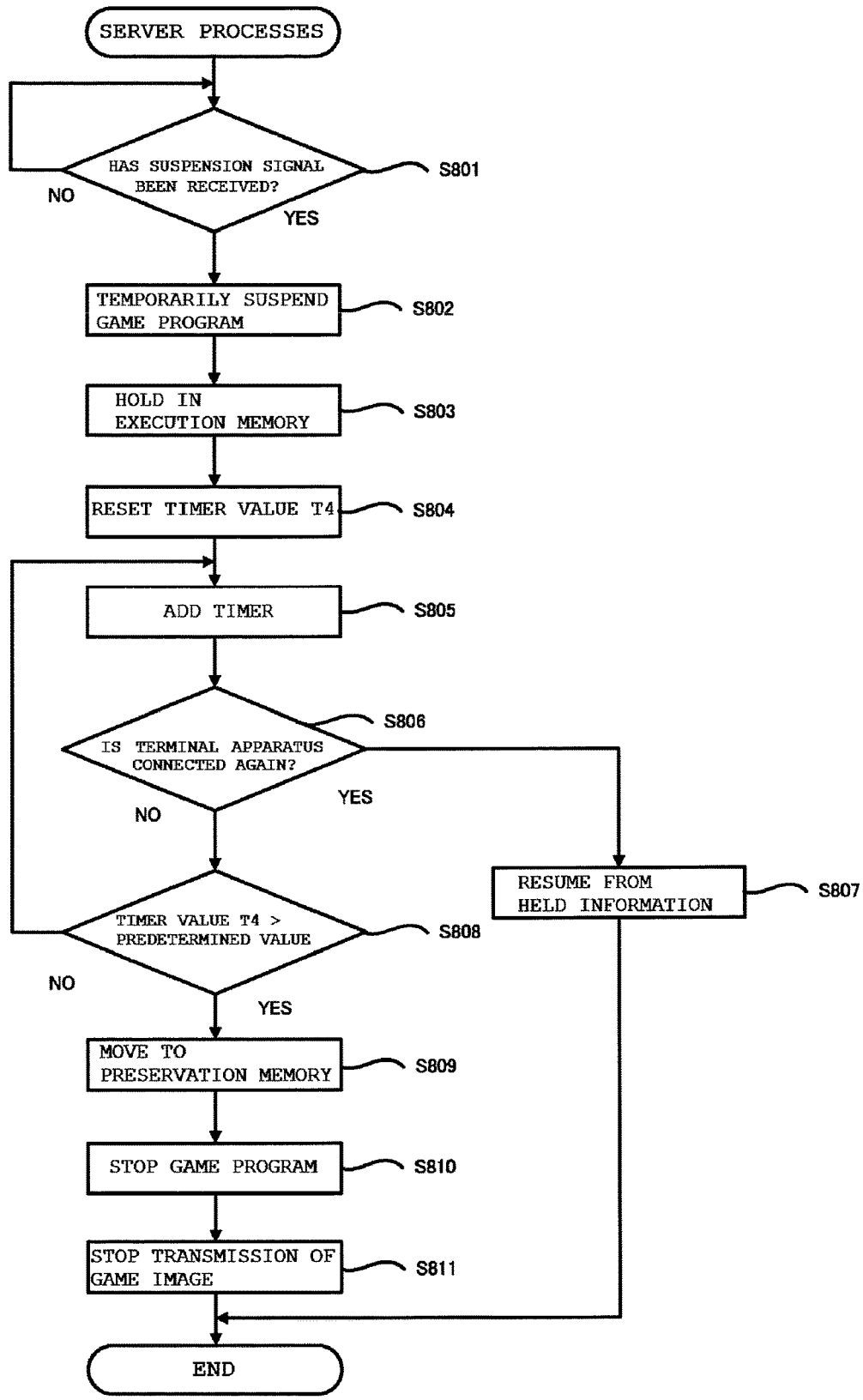
FIG. 17 is another flowchart exemplifying a game suspension process performed by the server apparatus according to the embodiment of the present invention.

A description will be made of specific processes of another game program temporary suspension process performed by the server apparatus 200 with reference to a flowchart of FIG. 17. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal.

In step S801, the server CPU 201 determines whether or not a suspension signal has been received from the terminal apparatus 100 via the server communication unit 208. In a case where it is determined that the suspension signal has not been received, the server CPU 201 repeats step S801 again. On the other hand, in a case where it is determined that the suspension signal has been received, the server CPU 201 causes the process to proceed to step S802.

In step S802, the server CPU 201 temporarily suspends execution of a currently executed game program in response to a request from the terminal apparatus 100, and causes the process to proceed to step S803.

In step S803, the server CPU 201 performs a process of holding information in an execution memory related to the currently executed game program in response to a request from the terminal apparatus 100. In other words, the CPU 201 holds the content of the game program developed in the server RAM 203 or the server VRAM 205 in the server RAM 203 or the server VRAM 205 as it is. The server CPU 201 causes the process to proceed to step S804. In step S803, the server CPU 201 adds the holding time point to information regarding the held game program as a suspension time point, and sets the information as suspended data. Information regarding game image data which is currently being rendered in the server VRAM 205 can be generated again and thus is not necessarily required to be held.

In other words, the server CPU 201 causes all memory information of a game program which is currently being executed in the server apparatus 200 to be held along with a progress situation of a game. More specifically, the server CPU performs a process of holding all memory spaces for a selected game program, which are secured by a launcher in the server RAM 203 or the server VRAM 205 as it is. Information regarding game image data which is currently being rendered in the server VRAM 205 can be generated again and thus is not necessarily required to be held.

In step S804, the server CPU 201 resets a timer value T4 to 0, and causes the process to proceed to step S805.

In step S805, the server CPU 201 adds a numerical value corresponding to elapsed time to the timer value T4, and causes the process to proceed to step S806.

In step S806, in a case where there is a reconnection request from the terminal apparatus 100 to the server apparatus 200 via the server communication unit 208, or there is a request for canceling the suspension, the server CPU 201 causes the process to proceed to step S807. On the other hand, in a case where there is no reconnection request from the terminal apparatus 100 to the server apparatus 200 via the server communication unit 208, or there is no request for canceling the suspension, the server CPU 201 causes the process to proceed to step S808.

In step S807, the server CPU 201 resumes the game program on the basis of the information in the execution memory, held in the server RAM 203 or the server VRAM 205 as it is in step S804, and finishes the process. In step S808, in a case where there is no data developed in the server VRAM 205, and an image is required to be rendered in the server GPU 204, the server CPU 201 instructs the server GPU 204 to render a game image again, and thus causes the server GPU 204 to regenerate a game image in the server VRAM 205 at the time of being suspended.

In step S808, the server CPU 201 determines whether or not the timer value T4 exceeds a predetermined value, and performs the process in step S805 again in a case where it is determined that the timer value does not exceed the predetermined value. On the other hand, in a case where it is determined that the timer value T4 exceeds the predetermined value, the server CPU 201 determines that a predetermined period of time has elapsed, and causes the process to proceed to step S809.

In step S809, the server CPU 201 performs a process of moving the information in the execution memory related to the currently executed game program to a preservation memory in response to a request from the terminal apparatus 100. In other words, the CPU 201 moves information regarding the game program developed in the server RAM 203 or the server VRAM 205 to the server storage 207. The server CPU 201 causes the process to proceed to step S810. In step S809, the server CPU 201 adds the movement time point to information regarding the moved game program as a suspension time point, and sets the information as suspended data. Information regarding game image data which is currently being rendered in the server VRAM 205 can be generated again and thus is not necessarily required to be moved.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

For example, the server RAM 201 or the server VRAM 205 is used as the execution memory, and the capacity thereof is finite. Therefore, if a plurality of programs are developed in the server RAM 201, the capacity thereof is exceeded, and thus information regarding a program or data is appropriately moved to the server storage 207 which is the preservation memory.

The preservation memory is not limited to the server storage 207, and may be provided in the server RAM 203 or the server VRAM 205, and may be other memories (not illustrated). The execution memory and the preservation memory may employ a physically identical memory, and may be used as appropriate so as to be differentiated from each other depending on an application.

The server CPU 201 stops processing on the game program in step S810, and stops transmission of coded moving image data to the terminal apparatus 100 in step S811. Here, stopping processing on the game program in step S810 indicates that information regarding the game program, secured by a launcher program is completely open from the execution memory.

As long as step S811 is executed after step S802, processing order may be changed as appropriate.

Regarding the process in step S809, since the preservation memory frequently uses a memory whose processing speed is lower than that of the execution memory, the predetermined period of time in step S808 is preferably set to appropriate time so that the temporary suspension process does not frequently occur.

<16. Game Program Temporary Suspension Process (4)>

A description will be made of specific processes of still another game program temporary suspension process performed by the server apparatus 200 with reference to a flowchart of FIG. 18. Processes corresponding to the flowchart may be realized by the server CPU 201 reading a corresponding processing program stored in, for example, the server ROM 202, and developing the program in the server RAM 203, and executing the program. This game program temporary suspension process is appropriately performed, for example, when the server apparatus 200 performs processes of generating and transmitting a game image.

In step S821, the server CPU 201 resets a timer value T5 and a timer value T6 to 0, and causes the process to proceed to step S822.

In step S822, the server CPU 201 determines whether or not communication with the terminal apparatus 100 via the server communication unit 208 is stopped. In a case where it is determined that communication is not stopped, the server CPU 201 repeats step S821 again. On the other hand, in a case where it is determined that communication is stopped, the server CPU 201 causes the process to proceed to step S823.

In step S823, the server CPU 201 adds a numerical value corresponding to elapsed time to the timer value T5, and causes the process to proceed to step S824.

In step S824, the server CPU 201 determines whether or not the timer value T5 exceeds a predetermined value, and performs the process in step S822 again in a case where it is determined that the timer value does not exceed the predetermined value. On the other hand, in a case where it is determined that the timer value T5 exceeds the predetermined value, the server CPU 201 determines that communication is stopped for a predetermined period of time, and causes the process to proceed to step S825.

In step S825, since communication with the terminal apparatus 100 is stopped and thus image data cannot be transmitted, the server CPU 201 temporarily suspends execution of a game program, and causes the process to proceed to step S826.

In step S826, the server CPU 201 performs a process of holding information regarding the game program at the time of the temporary suspension in the execution memory. In other words, the CPU 201 holds the content of the game program developed in the server RAM 203 or the server VRAM 205 in the server RAM 203 or the server VRAM 205 as it is. The server CPU 201 causes the process to proceed to step S827. In step S826, the server CPU 201 adds the holding time point to information regarding the held game program as a suspension time point, and sets the information as suspended data. Information regarding game image data which is currently being rendered in the server VRAM 205 can be generated again and thus is not necessarily required to be held.

Here, holding in the execution memory will be described in detail. Regarding the holding in the execution memory, the content of the server RAM 203 or the server VRAM 205 at the time of temporary suspension in step S825 is held in the server RAM 203 or the server VRAM 205 as it is. The server RAM 203 records information regarding the developed game program and a progress situation of the game program, or coded moving image data which is currently being buffered, and the server VRAM 205 records information regarding game image data which is currently being rendered.

In other words, the server CPU 201 causes all memory information of a game program which is currently being executed in the server apparatus 200 to be held along with a progress situation of a game. More specifically, the server CPU performs a process of holding all memory spaces for a selected game program, which are secured by a launcher in the server RAM 203 or the server VRAM 205 as it is. As described above, information regarding game image data which is currently being rendered in the server VRAM 205 can be generated again and thus is not necessarily required to be held.

In step S827, the server CPU 201 adds a numerical value corresponding to elapsed time to the timer value T6, and causes the process to proceed to step S828.

In step S828, the server CPU 201 determines whether or not communication with the terminal apparatus 100 via the server communication unit 208 is recovered. In a case where it is determined that communication is not recovered, the server CPU 201 causes the process to proceed to step S829. On the other hand, in a case where it is determined that communication is recovered, the server CPU 201 causes the process to proceed to step S830.

In step S830, the server CPU 201 resumes the game program on the basis of the information in the execution memory held in step S826, and finishes the process.

In step S829, the server CPU 201 determines whether or not the timer value T6 exceeds a predetermined value, and performs the process in step S827 again in a case where it is determined that the timer value does not exceed the predetermined value. On the other hand, in step S829, in a case where it is determined that the timer value T6 exceeds the predetermined value, the server CPU 201 determines that communication with the terminal apparatus 100 is stopped and there is no chance of communication recovery, and causes the process to proceed to step S831.

In step S831, since communication with the terminal apparatus 100 is stopped and there is no chance of communication recovery, the server CPU 201 performs a process of moving the information regarding the game program from an execution memory to a preservation memory. In other words, the CPU 201 moves the content of the game program developed in the server RAM 203 or the server VRAM 205 to the server storage 207. The server CPU 201 causes the process to proceed to step S832. In step S831, the server CPU 201 adds the movement time point to information regarding the moved game program as a suspension time point, and sets the information as suspended data. Information regarding game image data which is currently being rendered in the server VRAM 205 can be generated again and thus is not necessarily required to be moved.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

For example, the server RAM 201 or the server VRAM 205 is used as the execution memory, and the capacity thereof is finite. Therefore, if a plurality of programs are developed in the server RAM 201, the capacity thereof is exceeded, and thus information regarding a program or data is appropriately moved to the server storage 207 which is the preservation memory.

The preservation memory is not limited to the server storage 207, and may be provided in the server RAM 203 or the server VRAM 205, and may be other memories (not illustrated). The execution memory and the preservation memory may employ a physically identical memory, and may be used as appropriate so as to be differentiated from each other depending on an application.

The server CPU 201 stops processing on the game program in step S832, and stops transmission of coded moving image data to the terminal apparatus 100 in step S833. Here, stopping processing on the game program in step S832 indicates that information regarding the game program, secured by a launcher program is completely open from the execution memory.

Processing order of step S821 may be changed as appropriate as long as the step is executed before the timer counter addition loop, and, needless to say, the timer value T5 and the timer value T6 may be reset in separate steps.

Regarding the process in step S831, since the preservation memory frequently uses a memory whose processing speed is lower than that of the execution memory, the predetermined period of time in step S829 is preferably set to appropriate time so that the temporary suspension process does not frequently occur.

The above-described process is very useful in a case where the terminal apparatus 100 is located in an area in which a communication environment is not favorable, or a case where temporary communication stoppage occurs due to delay of a handover process at a boundary between a plurality of radio communication base stations. Therefore, the appropriate timer value T5 and timer value T6 are preferably set on the basis of expected communication stoppage time in the terminal apparatus 100 used by a user. In a case where a communication situation of the terminal apparatus 100 is not favorable, the server CPU 201 may automatically set the timer value T5 and the timer value T6 to be great. The server CPU 201 may successively monitor a communication situation of the terminal apparatus 100 so as to vary the timer value T5 and the timer value T6 in real time.

<17. Game Program Resuming Process (2)>

Figure 19:
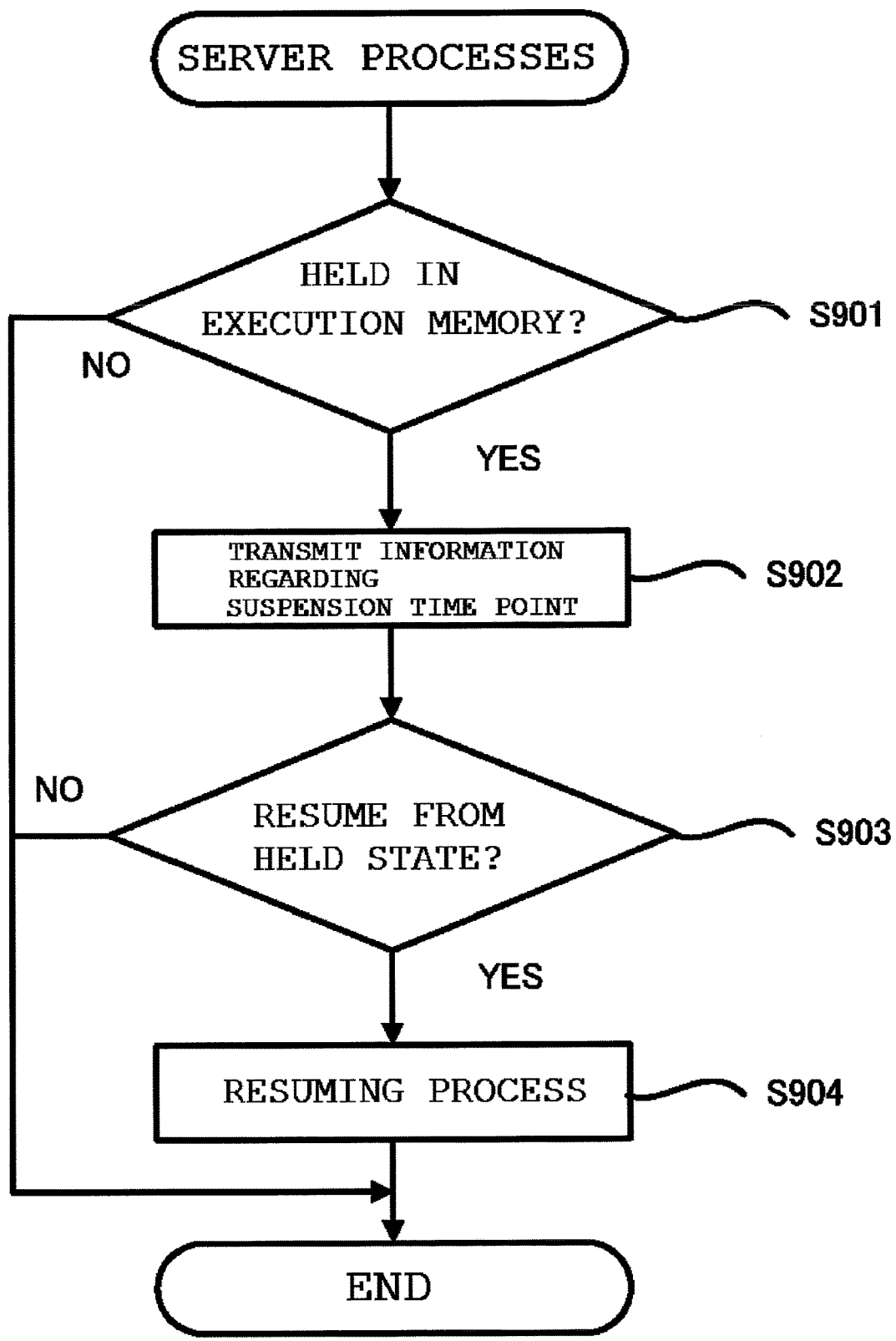
FIG. 19 is still another flowchart exemplifying a game program resuming process performed by the server apparatus according to the embodiment of the present invention.

A description will be made of specific processes of another game program resuming process performed by the server apparatus 200 with reference to a flowchart of FIG. 19. Processes corresponding to the flowchart may be realized by the server CPU 201 reading a corresponding processing program stored in, for example, the server ROM 202, and developing the program in the server RAM 203, and executing the program.

In step S901, the server CPU 201 determines whether or not there is temporarily suspended information in the server RAM 203 and the server VRAM 205 which are execution memories with respect to a game program to be activated in response to a request from the terminal apparatus 100, and finishes the process in a case where it is determined that there is no temporarily suspended information in the server RAM 203 and the server VRAM 205. On the other hand, in a case where it is determined that there is temporarily suspended information in the server RAM 203 and the server VRAM 205, the server CPU 201 causes the process to proceed to step S902. Information regarding game image data which is currently being rendered in the server VRAM 205 can be generated again and thus is not necessarily required to be held.

In step S902, the server CPU 201 transmits a suspension time point or the like to the terminal apparatus 100, and causes the process to proceed to step S903. Consequently, the user operating the terminal apparatus 100 can know the suspension time point or the like, and can thus obtain an index for determining whether or not the game program is resumed from a state held in the execution memories.

In step S903, the server CPU 201 causes the process to proceed to step S904 in a case where a request for resuming the temporarily suspended game program is received from the terminal apparatus 100, and finishes the process in a case where there is no request for resuming the temporarily suspended game program from the terminal apparatus 100.

In step S904, the server CPU 201 resumes processing on the game program from the temporarily suspended information held in the server RAM 203 and the server VRAM 205 which are execution memories. In step S904, in a case where there is no data developed in the server VRAM 205, and an image is required to be rendered in the server GPU 204, the server CPU 201 instructs the server GPU 204 to render a game image again, and thus causes the server GPU 204 to regenerate a game image in the server VRAM 205 at the time of being temporarily suspended.

In the above-described process, the server apparatus 200 resumes processing on the game program from the temporarily suspended information held in the server RAM 203 and the server VRAM 205 which are execution memories in a case where a request for resuming the temporarily suspended game program is received from the terminal apparatus 100, but, in a case where the temporarily suspended information is held in the server RAM 203 and the server VRAM 205 which are execution memories, the server apparatus 200 may automatically resume processes such as generation and transmission of a game image when the terminal apparatus 100 accesses the server apparatus 200.

As mentioned above, since the server apparatus 200 can perform a restoring process by using the information held in the execution memories, a game program which is temporarily suspended in a predetermined condition can be resumed without using a save function based on a savepoint specific to the game program. Particularly, the existing game program cannot be required to be modified. The predetermined condition is each condition in which information regarding the game program is held in the execution memory or is moved from the execution memory to the preservation memory, such as when a suspension signal is received from the terminal apparatus 100 or when communication with the terminal apparatus 100 is stopped.

<18. Game Program Resuming Process (3)>

Figure 20:
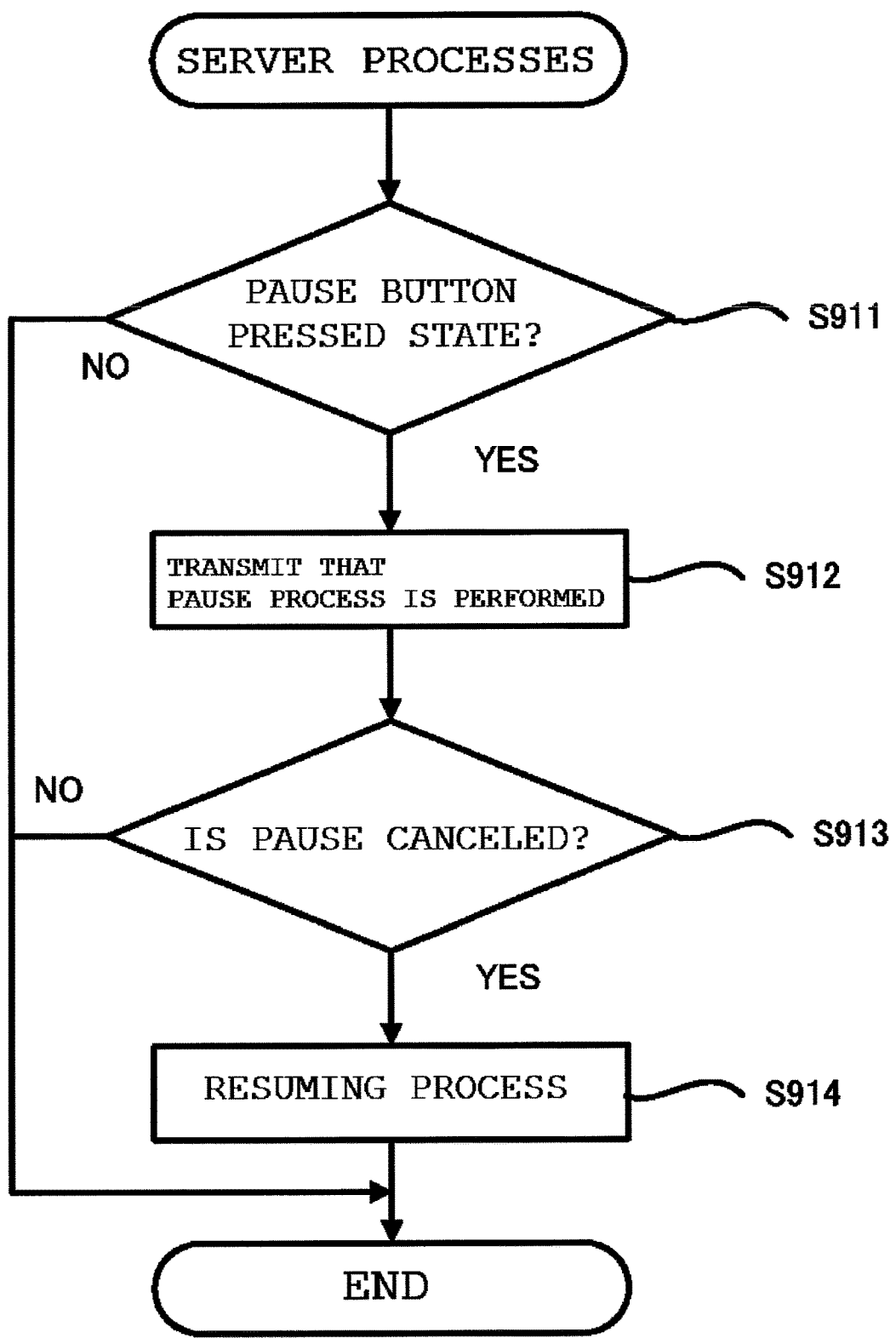
FIG. 20 is still another flowchart exemplifying a game program resuming process performed by the server apparatus according to the embodiment of the present invention.

A description will be made of specific processes of still another game program resuming process performed by the server apparatus 200 with reference to a flowchart of FIG. 20. Processes corresponding to the flowchart may be realized by the server CPU 201 reading a corresponding processing program stored in, for example, the server ROM 202, and developing the program in the server RAM 203, and executing the program.

In step S911, the server CPU 201 determines whether or not a pause state occurs due to pressing of a pause button with respect to a game program to be activated in response to a request from the terminal apparatus 100, and finishes the process in a case where it is determined that the pause state does not occur. On the other hand, in a case where it is determined that the pause state occurs due to pressing of the pause button, the server CPU 201 causes the process to proceed to step S912. The pause button pressed state is a state in which a user operates the terminal apparatus 100 so as to press the pause button, and thus a progress of a game program is temporarily suspended, and includes a case where the server apparatus 200 side equivalently generates a pause button pressing signal due to communication stoppage or the like so as to perform interruption, as will be described in the next embodiment.

Here, in the present embodiment, the "pause" is one of processes installed in a game program, and is a process in which, for example, temporary suspension is performed in a state in which a request is made through a user's pause button pressing operation and a progress of a game can be temporarily suspended, but the game program continuously operates, and holding or moving of information in an execution memory is not performed. In other words, the "pause" is a process of being capable of temporarily suspending a progress situation of a game, and rewriting information in an execution memory.

In step S912, the server CPU 201 transmits information indicating the pause state in which a progress of the game program is temporarily suspended, to the terminal apparatus 100, and causes the process to proceed to step S913.

In step S913, the server CPU 201 causes the process to proceed to step S914 in a case where information including a request for canceling the pause process through the pause button pressing operation is received from the terminal apparatus 100, and finishes the process in a case where there is no request for canceling the pause process.

In step S914, the server CPU 201 cancels the pause process, and thus resumes processing on the game program whose progress situation is temporarily suspended due to the pause function.

Regarding a temporary suspension method of a progress situation of a game program, there may be a method in which the server CPU 201 equivalently generates a pause button operation signal so as to interrupt the game program, regardless of a user's pressing operation on the pause button, in order to activate the pause process installed in the game program. The pause button operation signal may be generated by a launcher program, and may be generated by other programs.

Regarding a temporary suspension method of a progress situation of a game program, there may be a method in which the server CPU 201 equivalently generates a menu button operation signal so as to interrupt the game program, regardless of a user's pressing operation on the menu button, in order to activate a menu display function installed in the game program. The menu button operation signal may be generated by a launcher program, and may be generated by other programs.

Here, in the present embodiment, the "menu display" is one of processes installed in the game program, and is a process in which, for example, a request is made through a user's operation, and a menu screen of the game program is displayed unlike the pause process. The menu button is not necessarily required to be displayed on a game screen, and may not be defined as a physical button. Thus, the "menu button pressing operation" is assumed to include all operations for generating a menu button operation signal.

The menu display is to display, for example, a menu screen for performing various settings or changing items in the game during progress of the game program, and has a function equivalent to the pause process in that the progress of the game program is temporarily suspended due to the menu display.

However, in a case where the pause process is not accepted in the game program, for example, in a case of a time period in which only a cut scene or a moving image, a so-called movie scene, is reproduced, the pause process is not performed. Thus, if the menu display function is installed in the game program, the server CPU 201 causes the menu button operation signal to interrupt the game program so as to temporarily suspend a progress of the game program even in a case where the pause process is not accepted.

In a case where the pause process is performed in other embodiments, the menu display function is assumed to be used along therewith or to be used instead thereof.

As mentioned above, in the server apparatus 200, it is also possible to preserve a progress situation of a game by using the pause process installed in the game program. The pause process is canceled, and thus the game program can be resumed. Particularly, the existing game program cannot be modified.

<19. Game Program Temporary Suspension Process (5)>

Figure 21:
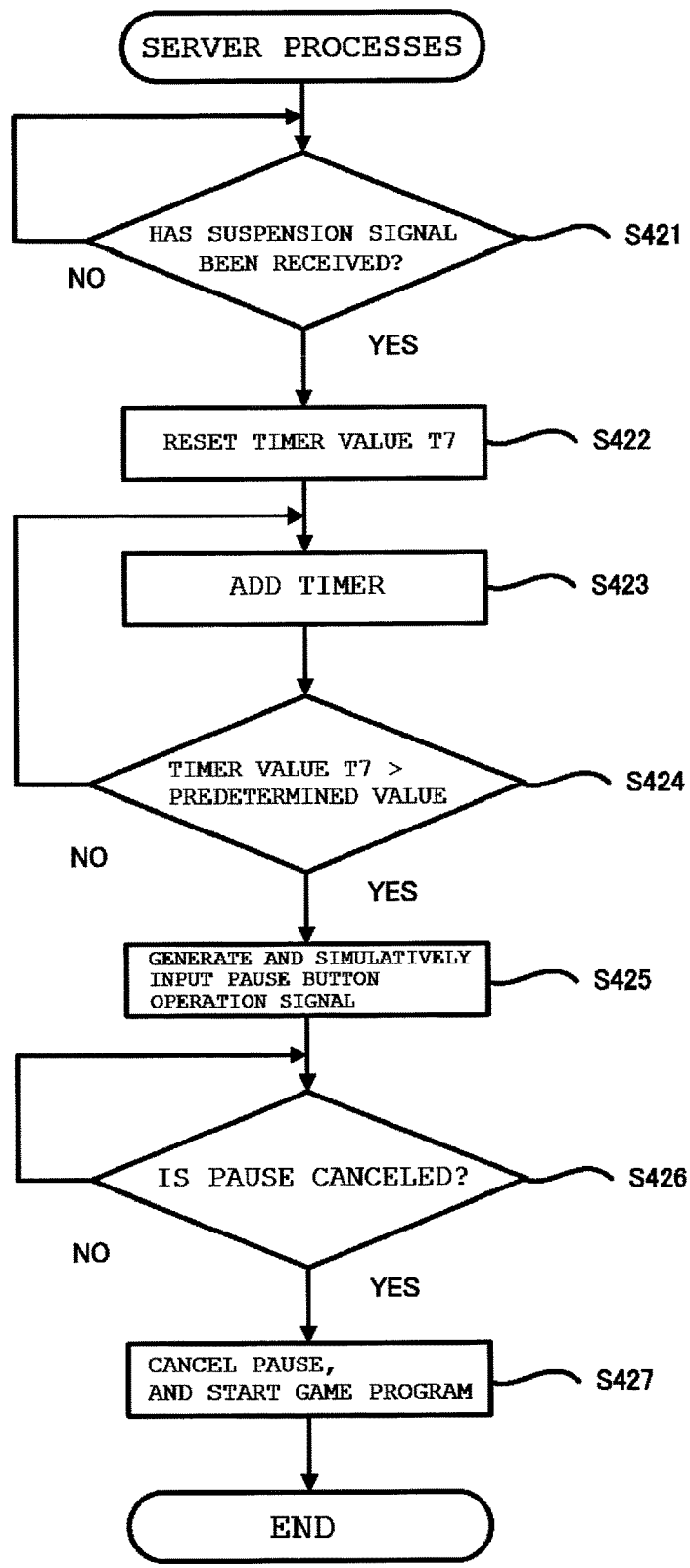
FIG. 21 is still another flowchart exemplifying a game program temporary suspension process performed by the server apparatus according to the embodiment of the present invention.

A description will be made of specific processes of a game program temporary suspension process performed by the server apparatus 200 with reference to a flowchart of FIG. 21. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal from the terminal apparatus 100. This game program temporary suspension process may be changed so as to be started by the server apparatus 200, for example, when the server CPU 201 detects that communication with the terminal apparatus 100 has been stopped, as described in FIG. 18. The following description will be made assuming that the game image display program described in FIG. 4 and the program for transmitting a suspension signal described in FIG. 5 or the like are operating in the terminal apparatus 100.

In step S421, the server CPU 201 determines whether or not a suspension signal has been received from the terminal apparatus 100 via the server communication unit 208. In a case where it is determined that the suspension signal has not been received, the server CPU 201 repeats step S422 again. On the other hand, in a case where it is determined that the suspension signal has been received, the server CPU 201 causes the process to proceed to step S422.

In step S422, the server CPU 201 resets a timer value T7 to 0, and causes the process to proceed to step S423.

In step S423, the server CPU 201 adds a numerical value corresponding to elapsed time to the timer value T7, and causes the process to proceed to step S424.

In step S424, the server CPU 201 determines whether or not the timer value T7 exceeds a predetermined value, and performs the process in step S423 again in a case where it is determined that the timer value does not exceed the predetermined value. On the other hand, in a case where it is determined that the timer value T7 exceeds the predetermined value, the server CPU 201 determines that a predetermined period of time has elapsed, and causes the process to proceed to step S425.

The predetermined value in step S424 is typically 0. When the suspension signal is received, a pause process which will be described later is rapidly performed, and thus it is possible to appropriately preserve a progress situation of a game program.

In step S425, the server CPU 201 performs the pause process of the game program which is being executed in response to a request from the terminal apparatus 100. In other words, the CPU 201 generates a signal equivalent to a pause button operation signal in order to activate the pause process installed in the game program, thereby assuming that there is a request for the pause process, and simulatively inputs the generated signal to the game program. In a case where the pause process installed in the game program cannot be performed, the server CPU 201 generates a signal equivalent to a menu button operation signal in order to display a menu screen after a predetermined period of time elapses, for example, after several frames in image rendering, thereby assuming that there is a request for display of the menu screen, and simulatively inputs the generated signal to the game program. As described in other embodiments, the menu screen display can achieve an effect equivalent to that in the pause process, and thus the game program can be doubly temporarily suspended even in a scene on which the pause process cannot be performed.

Here, in the present embodiment, the "pause" is one of processes installed in a game program, and is a process in which, for example, temporary suspension is performed in a state in which a request is made through a user's pause button pressing operation and a progress of a game can be temporarily suspended, but the game program continuously operates, and holding or moving of information in an execution memory is not performed. In other words, the "pause" is a process of being capable of temporarily suspending a progress situation of a game, and rewriting information in an execution memory.

Thereafter, the server CPU 201 continuously performs the pause process of the game program until a signal for requesting cancelation of the pause process is transmitted from the terminal apparatus through an input operation on the pause button by the user.

Specifically, in step S426, the server CPU 201 determines whether or not there is a request for canceling the pause process through an input operation on the pause button. In a case where it is determined that there is a request for canceling the pause process, the server CPU 201 causes the process to proceed to step S427 so as to cancel the pause process, and finishes the process. In a case where there is no request for canceling the pause process, the server CPU 201 causes the process to proceed to step S426 so as to continuously perform the pause process.

Here, it is assumed that the game image generation/transmission process described in other embodiments is continuously performed during the pause process of the game program. Actually, a game image is not generally changed during the pause process, but the game image may be changed even during the pause process, for example, an icon or the like indicating the pause process may be moved, and thus the game image generation/transmission process is required to be continuously performed. A game screen during the pause process may be held as a screen shot on the terminal apparatus 100 side, and the screen shot may be displayed on the terminal apparatus 100 side, so that the server apparatus 200 stops transmission of a game image.

<19. Game Program Temporary Suspension Process (6)>

Figure 22:
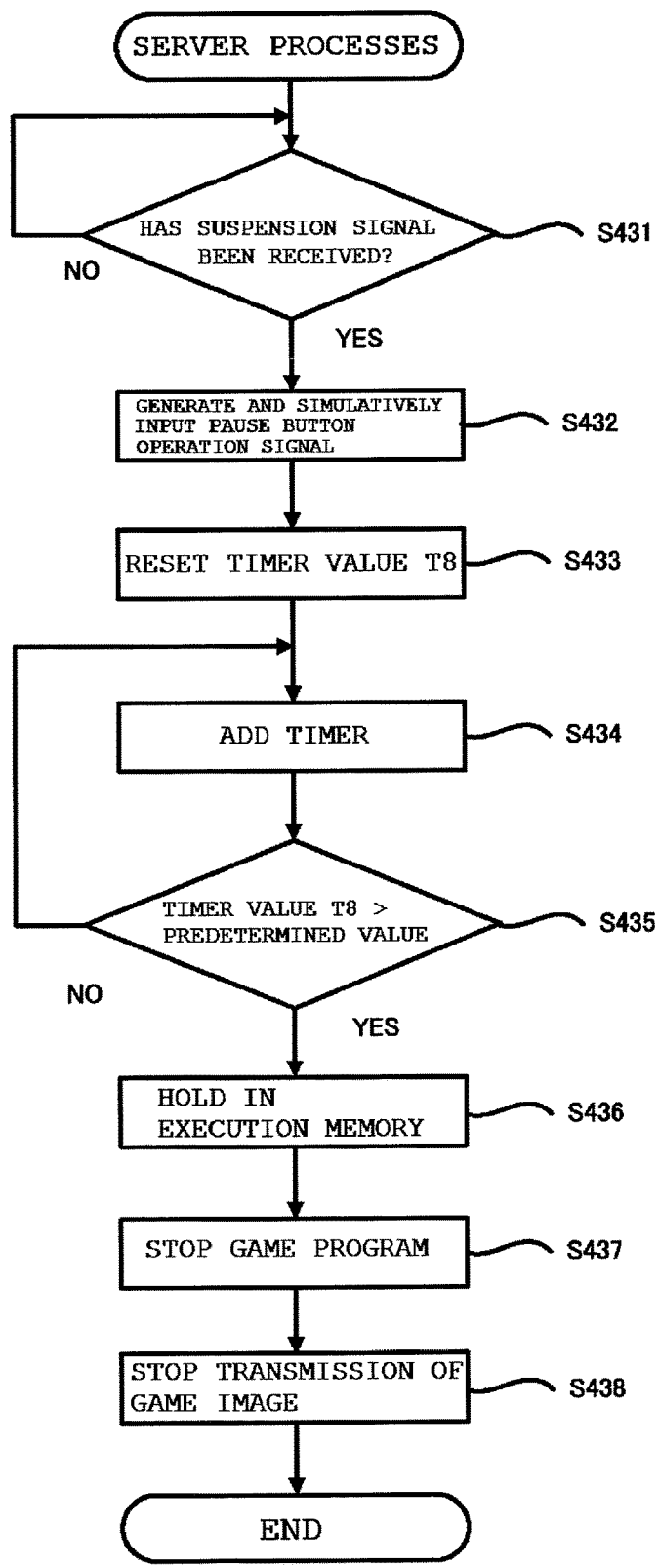
FIG. 22 is still another flowchart exemplifying a game program temporary suspension process performed by the server apparatus according to the embodiment of the present invention.

A description will be made of specific processes of a game program temporary suspension process performed by the server apparatus 200 with reference to a flowchart of FIG. 22. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal from the terminal apparatus 100. The following description will be made assuming that the game image display program described in FIG. 4 and the program for transmitting a suspension signal described in FIG. 5 or the like are operating in the terminal apparatus 100.

In step S431, the server CPU 201 determines whether or not a suspension signal has been received from the terminal apparatus 100 via the server communication unit 208. In a case where it is determined that the suspension signal has not been received, the server CPU 201 repeats step S431 again.

On the other hand, in a case where it is determined that the suspension signal has been received, the server CPU 201 causes the process to proceed to step S432.

In step S432, the server CPU 201 performs the pause process of the game program which is being executed in response to a request from the terminal apparatus 100. In other words, the CPU 201 generates a signal equivalent to a pause button operation signal in order to activate the pause process installed in the game program, thereby assuming that there is a request for the pause process, and simulatively inputs the generated signal to the game program.

Here, in the present embodiment, the "pause" is one of processes installed in a game program, and is a process in which, for example, temporary suspension is performed in a state in which a request is made through a user's pause button pressing operation and a progress of a game can be temporarily suspended, but the game program continuously operates, and holding or moving of information in an execution memory is not performed. In other words, the "pause" is a process of being capable of temporarily suspending a progress situation of a game, and rewriting information in an execution memory.

In step S433, the server CPU 201 resets a timer value T8 to 0, and causes the process to proceed to step S434.

In step S434, the server CPU 201 adds a numerical value corresponding to elapsed time to the timer value T8, and causes the process to proceed to step S435.

In step S435, the server CPU 201 determines whether or not the timer value T8 exceeds a predetermined value, and performs the process in step S434 again in a case where it is determined that the timer value does not exceed the predetermined value. On the other hand, in a case where it is determined that the timer value T8 exceeds the predetermined value, the server CPU 201 determines that a predetermined period of time has elapsed, and causes the process to proceed to step S436.

In step S436, the server CPU 201 performs a process of holding information in the execution memory related to the currently executed game program in response to a request from the terminal apparatus 100. In other words, the CPU 201 holds the content of the game program developed in the server RAM 203 or the server VRAM 205. The server CPU 201 causes the process to proceed to step S437. In the present embodiment, the information regarding the game program in the server VRAM 205 can be generated again, and may thus be held preliminarily in order to quicken a process on a game image right after the game is resumed.

Here, in the present embodiment, the term "holding" indicates that the memory content is not moved from the execution memory to the preservation memory and the content of the execution memory is kept remain in the execution memory, that is, in the server apparatus 200, the information regarding the game program in the server RAM 203 or the server VRAM 205 is not moved to the server storage 207, and is kept remain, including address information, in the server RAM 203 or the server VRAM 205.

The server CPU 201 stops processing on the game program in step S437, and stops transmission of coded moving image data to the terminal apparatus 100 in step S438.

The predetermined period of time in step S435 is, for example, 0 minutes. In this case, temporarily suspended information of the game program can be instantly held.

The predetermined period of time in step S435 is set to, for example, about 15 minutes. This is because, even in a case where the game image display program is temporarily suspended in the terminal apparatus 100, the game image display program may be immediately resumed. For example, if a process of holding memory information is started as soon as a suspension signal is received from the terminal apparatus 100, there is concern that a game image transmission process may be late since resuming of a progress of the game program is later than in a case of cancelation of the pause process.

In the above-described process flow, in a case where it is determined that communication between the terminal apparatus 100 and the server apparatus 200 cannot be performed due to degradation of a communication environment with the terminal apparatus 100, the server CPU 201 may perform the process in step S432 or the processes in steps S436 to step S438. Also in this case, the server CPU may perform the pause process on the game program and may wait for the memory information to be held until a predetermined period of time elapses from the time when it is determined that communication cannot be performed as described above.

<21. Game Program Temporary Suspension Process (7)>

A description will be made of specific processes of another game program temporary suspension process performed by the server apparatus 200 with reference to a flowchart of FIGS. 23 and 24. Processes corresponding to the flowchart may be realized by the server CPU 201 reading a corresponding processing program stored in, for example, the server ROM 202, and developing the program in the server RAM 203, and executing the program. This game program temporary suspension process is started, for example, when the server CPU 201 detects that the server apparatus 200 has received a suspension signal.

In step S841, the server CPU 201 determines whether or not a suspension signal has been received from the terminal apparatus 100 via the server communication unit 208. In a case where it is determined that the suspension signal has not been received, the server CPU 201 repeats step S841 again. On the other hand, in a case where it is determined that the suspension signal has been received, the server CPU 201 causes the process to proceed to step S842.

In step S842, the server CPU 201 temporarily suspends execution of a currently executed game program in response to a request from the terminal apparatus 100, and causes the process to proceed to step S843. In other words, the CPU 201 generates a signal equivalent to a pause button operation signal in order to activate the pause process installed in the game program, thereby assuming that there is a request for the pause process, and simulatively inputs the generated signal to the game program.

Here, in the present embodiment, the "pause" is one of processes installed in a game program, and is a process in which, for example, temporary suspension is performed in a state in which a request is made through a user's pause button pressing operation and a progress of a game can be temporarily suspended, but the game program continuously operates, and holding or moving of information in an execution memory is not performed. In other words, the "pause" is a process of being capable of temporarily suspending a progress situation of a game, and rewriting information in an execution memory. The pause button is not necessarily required to be displayed on a game screen, and may not be defined as a physical button. Thus, the "pause button pressing operation" is assumed to include all operations for generating a menu button operation signal.

The pause button operation signal in the process in step S842 may be generated by a launcher program, and may be generated by other programs.

In step S843, the server CPU 201 resets a timer value T9 to 0, and causes the process to proceed to step S844.

In step S844, the server CPU 201 adds a numerical value corresponding to elapsed time to the timer value T9, and causes the process to proceed to step S845.

In step S845, the server CPU 201 determines whether or not a pause button operation signal for requesting cancelation of the pause process is input from the terminal apparatus 100, inputs the pause button operation signal to the game program in step S846 so as to cancel the pause process in a case where the pause button operation signal is input, and finishes the process. On the other hand, in a case where it is determined that the pause button operation signal is not input, the server CPU 201 causes the process to proceed to step S847.

In step S847, the server CPU 201 determines whether or not the timer value T9 exceeds a predetermined value, and performs the process in step S844 again in a case where it is determined that the timer value does not exceed the predetermined value. On the other hand, in a case where it is determined that the timer value T9 exceeds the predetermined value, the server CPU 201 determines that a user does not request the cancellation of the pause process, and causes the process to proceed to step S848.

In step S848, the server CPU 201 performs a process of holding information in an execution memory related to the currently executed game program in response to a request from the terminal apparatus 100. In other words, the CPU 201 holds the content of the game program developed in the server RAM 203 or the server VRAM 205 in the server RAM 203 or the server VRAM 205 as it is. The server CPU 201 causes the process to proceed to step S849. In step S848, the server CPU 201 adds the holding time point to information regarding the held game program as a suspension time point, and sets the information as suspended data. Information regarding game image data which is currently being rendered in the server VRAM 205 can be generated again and thus is not necessarily required to be held.

In step S849, the server CPU 201 resets a timer value T10 to 0, and causes the process to proceed to step S850.

In step S850, the server CPU 201 adds a numerical value corresponding to elapsed time to the timer value T10, and causes the process to proceed to step S851.

In step S851, in a case where there is a request for canceling the suspension from the terminal apparatus 100, the server CPU 201 causes the process to proceed to step S852. On the other hand, in a case where there is no request for canceling the suspension from the terminal apparatus 100, the server CPU 201 causes the process to proceed to step S853.

In step S852, the server CPU 201 resumes the game program on the basis of the information in the execution memory, held in the server RAM 203 or the server VRAM 205 as it is in step S848, and finishes the process. In step S852, in a case where there is no data developed in the server VRAM 205, and an image is required to be rendered in the server GPU 204, the server CPU 201 instructs the server GPU 204 to render a game image again, and thus causes the server GPU 204 to regenerate a game image in the server VRAM 205 at the time of being suspended.

In step S853, the server CPU 201 determines whether or not the timer value T2 exceeds a predetermined value, and performs the process in step S850 again in a case where it is determined that the timer value does not exceed the predetermined value. On the other hand, in a case where it is determined that the timer value T2 exceeds the predetermined value, the server CPU 201 determines that a predetermined period of time has elapsed, and causes the process to proceed to step S854.

In step S854, the server CPU 201 performs a process of moving the information in the execution memory related to the currently executed game program to a preservation memory in response to a request from the terminal apparatus 100. In other words, the CPU 201 moves information regarding the game program developed in the server RAM 203 or the server VRAM 205 to the server storage 207. The server CPU 201 causes the process to proceed to step S855. In step S854, the server CPU 201 adds the movement time point to information regarding the moved game program as a suspension time point, and sets the information as suspended data. Information regarding game image data which is currently being rendered in the server VRAM 205 can be generated again and thus is not necessarily required to be moved.

Here, the execution memory in the present embodiment is a memory to which a program is read when the program is executed, and the preservation memory is used to preserve information regarding the program unlike the execution memory. The execution memory and the preservation memory may be a physically single memory, but are preferably physically different from each other, for example, a memory having a high read/write speed is used as the execution memory, and a memory having a low read/write speed is used as the preservation memory.

For example, the server RAM 201 or the server VRAM 205 is used as the execution memory, and the capacity thereof is finite. Therefore, if a plurality of programs are developed in the server RAM 201, the capacity thereof is exceeded, and thus information regarding a program or data is appropriately moved to the server storage 207 which is the preservation memory.

The preservation memory is not limited to the server storage 207, and may be provided in the server RAM 203 or the server VRAM 205, and may be other memories (not illustrated). The execution memory and the preservation memory may employ a physically identical memory, and may be used as appropriate so as to be differentiated from each other depending on an application.

The server CPU 201 stops processing on the game program in step S855, and stops transmission of coded moving image data to the terminal apparatus 100 in step S856. Here, stopping processing on the game program in step S855 indicates that information regarding the game program, secured by a launcher program is completely open from the execution memory.

Regarding the process in step S854, since the preservation memory frequently uses a memory whose processing speed is lower than that of the execution memory, the predetermined period of time in step S853 is preferably set to appropriate time so that the temporary suspension process does not frequently occur.

Figure 18:
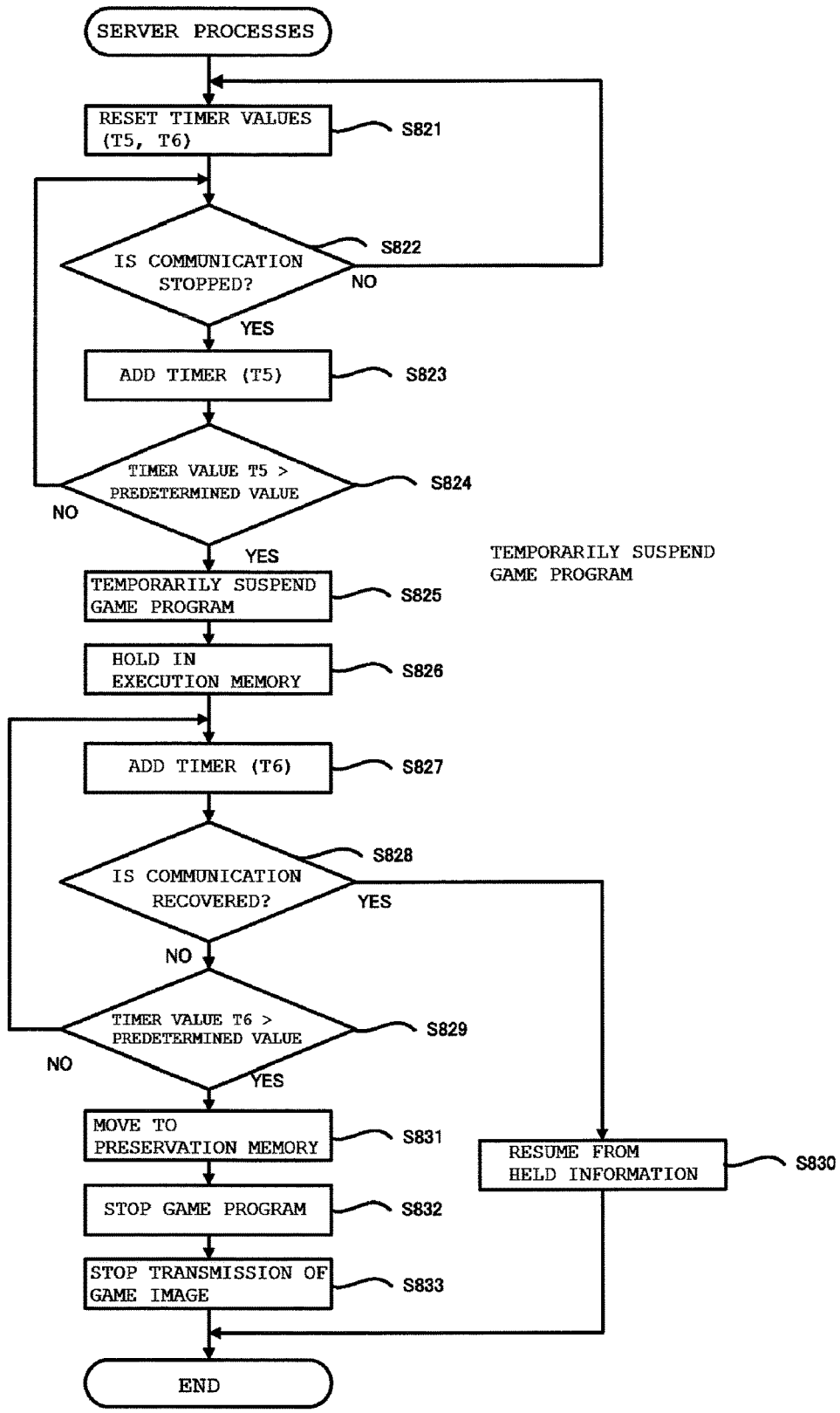
FIG. 18 is still another flowchart exemplifying a game suspension process performed by the server apparatus according to the embodiment of the present invention.

The suspension signal in step S841 may be simulatively generated by the server CPU 201 in a predetermined condition as described in FIG. 18.

The process in step S842 may be performed not in a case where the suspension signal is received in step S841 but in a case where the pause button is pressed through the user's input operation, and a normal pause button operation signal is input from the terminal apparatus 100.

Figure 23:
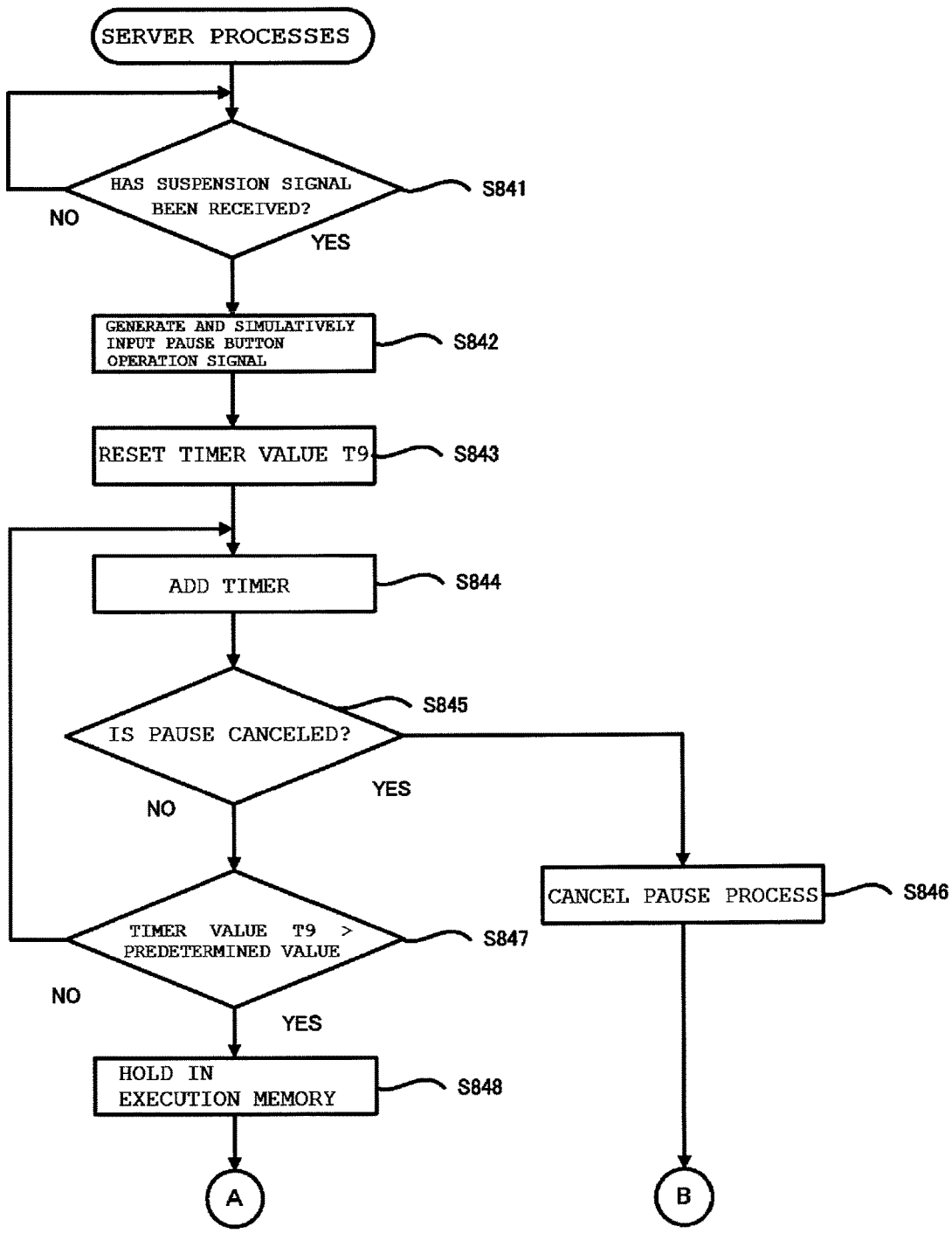
FIG. 23 is still another flowchart exemplifying a game suspension process performed by the server apparatus according to the embodiment of the present invention.
Figure 24:
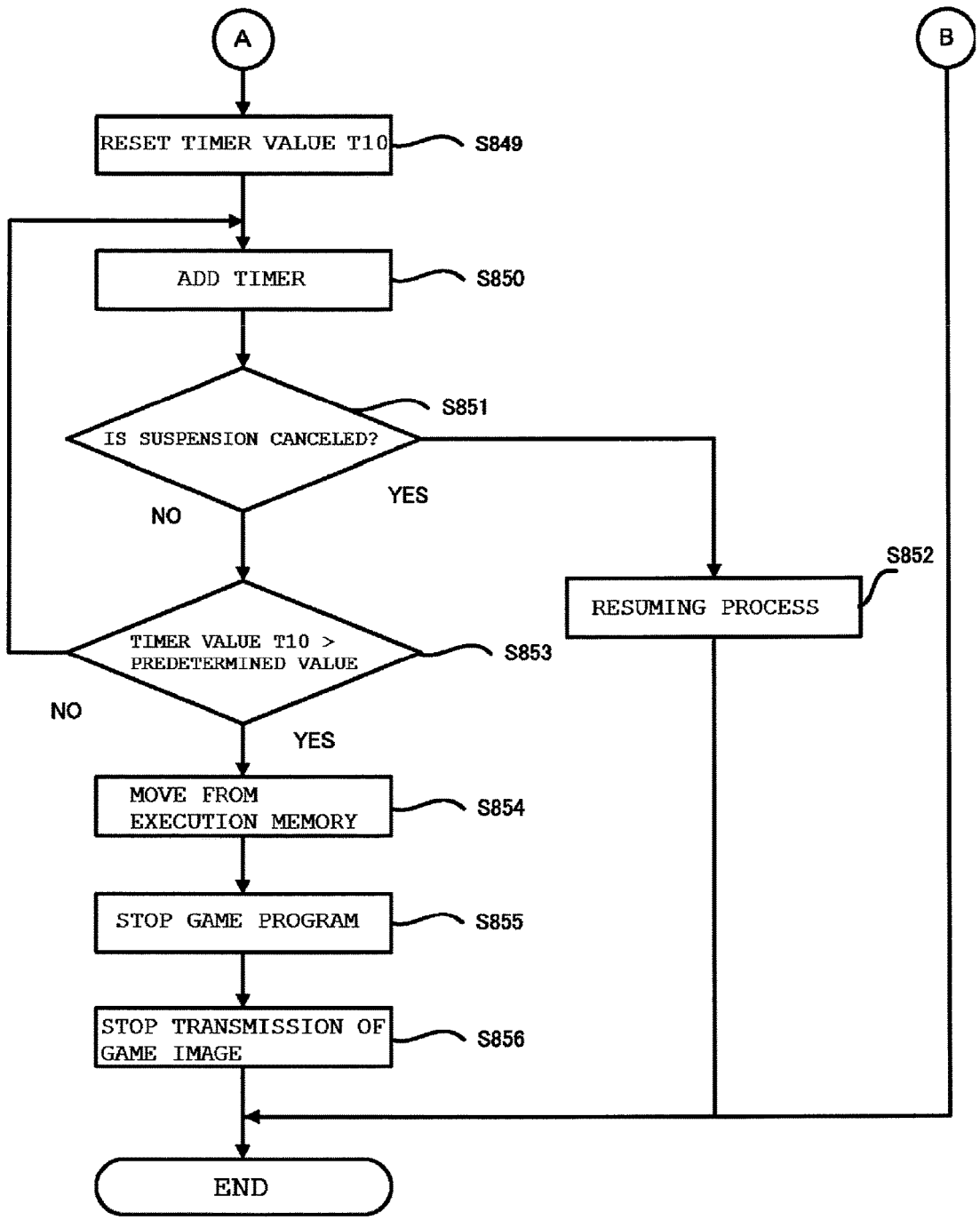
FIG. 24 is still another flowchart exemplifying a game suspension process performed by the server apparatus according to the embodiment of the present invention.

As described in the flowcharts of FIGS. 23 and 24, in the server apparatus 200, a progress situation of a game program can be preserved without using a save function based on a savepoint specific to the game program by performing the pause process of the game program, holding in an execution memory, and movement to a preservation memory. In the server apparatus 200, the pause process of the game program, holding in the execution memory, and movement to the preservation memory may be selectively performed in combination with each other.

In the above-described respective embodiments, in the server apparatus 200, the pause process of the game program, holding in the execution memory, and movement to the preservation memory may be performed alone or in combination with each other. In other words, there may be a combination of the pause process (including menu screen display) of the game program and holding in the execution memory, a combination of the pause process of the game program and movement to the preservation memory, and a combination of holding in the execution memory and movement to the preservation memory.

In the above-described respective embodiments, preservation of a progress situation of a game program includes various preservation aspects in addition to the method of generating saved data at a savepoint or the like specific to the game program, and indicates that a progress situation of the game program is held in a reproducible state by performing the pause process (including menu screen display) of the game program, holding in the execution memory, and movement to the preservation memory.

As described above, in the interactive system of the present embodiment, it is possible to appropriately preserve a progress situation of a game program in response to a request from the terminal apparatus.

In the interactive system of the present embodiment, a progress situation of a game program can be preserved even in a case where a permitted condition (so-called savepoint) does not occur during execution of the game program.

In the interactive system of the present embodiment, in a case of a game program used in a local environment which is not compatible with a network, a progress situation can be arbitrarily preserved without rewriting the game program, and thus it is possible to provide a very useful service.

The present invention is not limited to the above-described embodiment, and is applicable to an interactive system in which a processing result of a program executed by a server apparatus in response to an input operation on a terminal apparatus performed by a user is provided to the terminal apparatus, and the server apparatus continuously repeatedly executes the program in response to an input operation on the terminal apparatus performed by the user. For example, the present invention is applicable to providing of processing on an existing application program using an emulator, or providing of a service such as a virtual machine (VM).

REFERENCE SIGNS LIST

100 TERMINAL APPARATUS, 200 SERVER APPARATUS, 300 NETWORK, 101 TERMINAL CPU, 102 TERMINAL ROM, 103 TERMINAL RAM, 104 TERMINAL DECODING UNIT, 105 TERMINAL COMMUNICATION UNIT, 106 TERMINAL DISPLAY UNIT, 107 OPERATION INPUT UNIT, 108 TERMINAL STORAGE, 201 SERVER CPU, 202 SERVER ROM, 203 SERVER RAM, 204 SERVER GPU, 205 SERVER VRAM, 206 SERVER CODING UNIT, 207 SERVER STORAGE, 208 SERVER COMMUNICATION UNIT, 601 OS, 602 FOREGROUND PROCESS, 603 BACKGROUND PROCESS

The invention claimed is:

1. An interactive system, comprising:
a terminal apparatus that is connected to a server apparatus via a network, requests the server apparatus to perform program processing, receives a processing result from the server apparatus, and displays the processing result; and
the server apparatus that performs the program processing in response to a request from the terminal apparatus, and transmits the processing result to the terminal apparatus,
wherein the terminal apparatus determines a predetermined condition in which execution of a display process of displaying the processing result from the server apparatus is suspended, and transmits a suspension signal to the server apparatus,
the suspension signal is transmitted to the server apparatus without a save function being performed, and
after the terminal apparatus requests the server apparatus to activate the program processing, the server apparatus transmits a suspension time point regarding suspended data to the terminal apparatus, with the suspended data being configured to reproduce a progress situation of the program processing corresponding to a state of being temporarily suspended.

2. The interactive system according to claim 1, wherein, in a case where the suspension signal is received, the server apparatus temporarily suspends the program processing requested by the terminal apparatus.

3. The interactive system according to claim 2, wherein, in the case where the suspension signal is received, the server apparatus continuously performs the program processing requested by the terminal apparatus until a predetermined period of time elapses, and temporarily suspends the program processing requested by the terminal apparatus in a case where the predetermined period of time has elapsed.

4. The interactive system according to claim 1, wherein, in a case where the suspension signal is received, the server apparatus temporarily suspends transmission of the processing result of the program processing requested by the terminal apparatus.

5. The interactive system according to claim 1, wherein the server apparatus includes an execution memory storing information used to perform the program processing requested by the terminal apparatus and a preservation memory which is different from the execution memory, and holds, in the execution memory, information stored in the execution memory on a basis of the program processing requested by the terminal apparatus in a temporary suspension process.

6. The interactive system according to claim 1, wherein the server apparatus includes an execution memory storing information used to perform the program processing requested by the terminal apparatus and a preservation memory which is different from the execution memory, and moves information stored in the execution memory to the preservation memory on a basis of the program processing requested by the terminal apparatus in a temporary suspension process.

7. The interactive system according to claim 1, wherein, in a case where the display process of displaying the processing result from the server apparatus is performed on a basis of a display program, and the display process based on the display program is temporarily suspended, the terminal apparatus transmits the suspension signal to the server apparatus.

8. The interactive system according to claim 1, wherein, in a case where the display process of displaying the processing result from the server apparatus is performed on a basis of a display program, the display process is one task in a multitasking process, and the display process based on the display program transitions to a background process, the terminal apparatus transmits the suspension signal to the server apparatus.

9. The interactive system according to claim 1, wherein the display process of displaying the processing result from the server apparatus is performed by a display program process,
the terminal apparatus includes an execution memory storing information used to perform the display program process and a preservation memory which is different from the execution memory, and
in a case where the display program process is one task in a multitasking process, and information stored in the execution memory is moved to the preservation memory on a basis of the display program process, the terminal apparatus transmits the suspension signal to the server apparatus.

10. The interactive system according to claim 1, wherein the program processing requested by the terminal apparatus is to generate saved data in a predetermined condition in response to a preservation request from a user of the terminal apparatus.

11. The interactive system according to claim 1, wherein the terminal apparatus includes an execution memory in which a display program is developed, and
in a case where the display process of displaying the processing result from the server apparatus is performed on a basis of the display program, the display process is one task in a multitasking process, the display process based on the display program is excluded from the execution memory, and the program processing is finished, the terminal apparatus transmits the suspension signal to the server apparatus.

12. A terminal apparatus, comprising:
a communication interface connected to a server apparatus via a network;
a processor; and
a memory including instructions that, when executed by the processor, cause the processor to perform operations including:
 requesting the server apparatus to perform program processing;
 receiving a processing result from the server apparatus;
 displaying the processing result;
 determining a predetermined condition in which execution of a display process is suspended; and
 transmitting a suspension signal to the server apparatus,
the suspension signal is transmitted to the server apparatus without a save function being performed, and
after the terminal apparatus requests the server apparatus to activate the program processing, the terminal apparatus receives a suspension time point regarding suspended data from the server apparatus, with the suspended data being configured to reproduce a progress situation of the program processing corresponding to a state of being temporarily suspended.

13. A control method for a terminal apparatus, comprising:
requesting, via a communication interface, a server apparatus connected via a network to perform program processing;
receiving, via the communication interface, a processing result from the server apparatus;
displaying, on a display, the processing result received from the server apparatus;

determining, by a processor, a predetermined condition in which the displaying of the processing result is suspended; and
transmitting, via the communication interface, a suspension signal to the server apparatus when suspension of the displaying of the processing result is determined,
the suspension signal is transmitted to the server apparatus without a save function being performed, and
after the terminal apparatus requests the server apparatus to activate the program processing, a suspension time point regarding suspended data is received from the server apparatus, with the suspended data being configured to reproduce a progress situation of the program processing corresponding to a state of being temporarily suspended.

14. A non-transitory computer-readable medium including a program that, when executed by a computer, causes the computer to execute operations comprising:
a process of requesting a server apparatus connected via a network to perform program processing;
a process of receiving a processing result from the server apparatus;
a process of displaying the processing result;
a process of determining a predetermined condition in which the process of displaying the processing result is suspended; and
a process of transmitting a suspension signal to the server apparatus when the suspension condition is determined,
the suspension signal is transmitted to the server apparatus without a save function being performed, and
after the terminal apparatus requests the server apparatus to activate the program processing, a suspension time point regarding suspended data is received from the server apparatus, with the suspended data being configured to reproduce a progress situation of the program processing corresponding to a state of being temporarily suspended.

15. A non-transitory computer-readable medium including a program that, when executed by a computer, causes the computer to execute operations comprising:
a process of performing program processing in response to a request from a terminal apparatus connected via a network;
a process of transmitting a processing result in the program processing to the terminal apparatus;
a process of receiving a suspension signal based on a predetermined condition in which a display process of displaying the processing result from the server apparatus in the terminal apparatus is suspended, from the terminal apparatus; and
a process of temporarily suspending the program processing requested by the terminal apparatus,
the suspension signal is received by the server apparatus without a save function being performed, and
after the terminal apparatus requests the server apparatus to activate the program processing, a suspension time point regarding suspended data is transmitted to the terminal apparatus, with the suspended data being configured to reproduce a progress situation of the program processing corresponding to a state of being temporarily suspended.

16. A control method for a server apparatus, comprising:
performing, by a processor, program processing in response to a request from a terminal apparatus connected via a network;
transmitting, via a communication interface, a processing result the program processing to the terminal apparatus;

receiving, via the communication interface, a suspension signal based on a predetermined condition in which a display process of displaying the processing result from the server apparatus in the terminal apparatus is suspended, from the terminal apparatus; and temporarily suspending the program processing requested by the terminal apparatus, the suspension signal is received by the server apparatus without a save function being performed, and after the terminal apparatus requests the server apparatus to activate the program processing, a suspension time point regarding suspended data is transmitted to the terminal apparatus, with the suspended data being configured to reproduce a progress situation of the program processing corresponding to a state of being temporarily suspended.

17. An interactive system comprising:

a terminal apparatus that is connected to a server apparatus via a network, requests the server apparatus to perform program processing, receives a processing result from the server apparatus, and displays the processing result; and the server apparatus that performs the program processing in response to a request from the terminal apparatus, and transmits the processing result to the terminal apparatus, wherein the server apparatus temporarily suspends a program based on a request from the terminal apparatus in a predetermined condition, and holds information regarding the program in an execution memory of the server apparatus in the execution memory as is, the server apparatus temporarily suspends the program without a save function being performed, and after the terminal apparatus requests the server apparatus to activate the program, the server apparatus transmits a suspension time point regarding the information held in the execution memory to the terminal apparatus, with the information being configured to reproduce a progress situation of the program corresponding to a state of being temporarily suspended.

18. The interactive system according to claim 17, wherein the predetermined condition is a case where there is no signal related to an input operation on the program from the terminal apparatus for a predetermined period of time.

19. The interactive system according to claim 17, wherein the predetermined condition is a case where communication with the terminal apparatus by the server apparatus is stopped for a predetermined period of time.

20. A server apparatus:

a communication interface connected to a terminal apparatus via a network;

a processor; and a memory including instructions that, when executed by the processor, cause the processor to perform operations including:

performing program processing in response to a request from the terminal apparatus;

transmitting a processing result to the terminal apparatus;

receiving a suspension signal based on a predetermined condition in which a display process of displaying the processing result from the server apparatus is suspended, from the terminal apparatus; and temporarily suspending the program processing requested by the terminal apparatus, the suspension signal is received by the server apparatus without a save function being performed, and after the terminal apparatus requests the server apparatus to activate the program processing, the server apparatus transmits a suspension time point regarding suspended data to the terminal apparatus, with the suspended data being configured to reproduce a progress situation of the program processing corresponding to a state of being temporarily suspended.

21. The server apparatus according to claim 20, further comprising:

an execution memory storing information used to perform the program processing; and a preservation memory which is different from the execution memory, wherein the server apparatus holds information regarding the program processing and stored in the execution memory for a predetermined period of time when the suspension signal is received from the terminal apparatus.

22. The server apparatus according to claim 20, further comprising:

an execution memory storing information used to perform the program processing; and a preservation memory which is different from the execution memory, wherein the server apparatus holds information regarding the program processing and stored in the execution memory for a predetermined period of time when communication with the terminal apparatus is stopped.

23. The server apparatus according to claim 22, wherein, in a case where the terminal apparatus is connected to the server apparatus again, the server apparatus resumes the program processing on a basis of the information stored in the execution memory.

24. The server apparatus according to claim 20, further comprising:

an execution memory storing information used to perform the program processing; and a preservation memory which is different from the execution memory, wherein the terminal apparatus is provided in plurality, and in a case where a suspension signal is received from a first terminal apparatus, and there is a request for resuming execution of the program processing from a second terminal apparatus, the server apparatus resumes the program processing on a basis of the information stored in the execution memory, and transmits the processing result to the second terminal apparatus.

25. The server apparatus according to claim 24, wherein pieces of login information transmitted from the first terminal apparatus and the second terminal apparatus are same as each other or are included in a predetermined group.

26. The server apparatus according to claim 21, wherein, in a case where there is a request for resuming execution of the program processing from the terminal apparatus, the server apparatus resumes the program processing on a basis of the information stored in the execution memory.

* * * * *